(12) United States Patent
Waldbaur et al.

(10) Patent No.: US 10,933,349 B2
(45) Date of Patent: Mar. 2, 2021

(54) MODULAR MOUNTING SYSTEM FOR COMPONENTS OF HEATING CHAMBER

(71) Applicant: AGILENT TECHNOLOGIES, INC., Loveland, CO (US)

(72) Inventors: Ansgar Waldbaur, Karlsruhe (DE); Armin Steinke, Ettlingen (DE); Ralf Schaeffer, Rheinzabern (DE)

(73) Assignee: Agilent Technologies, Inc., Santa Clara, CA (US)

( * ) Notice: Subject to any disclaimer, the term of this patent is extended or adjusted under 35 U.S.C. 154(b) by 881 days.

(21) Appl. No.: 14/595,947

(22) Filed: Jan. 13, 2015

(65) Prior Publication Data
US 2015/0196855 A1    Jul. 16, 2015

(30) Foreign Application Priority Data
Jan. 13, 2014  (GB) ..................... 1400500

(51) Int. Cl.
| | | |
|---|---|---|
| *B01D 15/12* | (2006.01) | |
| *G01N 30/30* | (2006.01) | |
| *B01D 15/16* | (2006.01) | |
| *F25B 21/04* | (2006.01) | |

(52) U.S. Cl.
CPC ........... *B01D 15/12* (2013.01); *B01D 15/161* (2013.01); *G01N 30/30* (2013.01); *F25B 21/04* (2013.01); *G01N 2030/303* (2013.01); *G01N 2030/3061* (2013.01)

(58) Field of Classification Search
None
See application file for complete search history.

(56) References Cited

U.S. PATENT DOCUMENTS

| | | | |
|---|---|---|---|
| 4,982,597 A | 1/1991 | Berger | |
| 5,983,710 A | 11/1999 | Uhen et al. | |
| 2004/0000522 A1* | 1/2004 | Xie | ..... B01D 15/206 210/656 |
| 2007/0181702 A1 | 8/2007 | Ziegler | |
| 2007/0292322 A1 | 12/2007 | Soung et al. | |

FOREIGN PATENT DOCUMENTS

| | | |
|---|---|---|
| EP | 309596 A1 | 4/1989 |
| EP | 0421595 A2 | 4/1991 |
| GB | 2432800 | 6/2007 |
| JP | 2000111536 A | 4/2000 |
| WO | WO2011085359 | 7/2011 |
| WO | WO2013028450 | 2/2013 |

OTHER PUBLICATIONS

Search Report dated Jul. 11, 2014 in GB Patent Application No. 1400500.3.

* cited by examiner

*Primary Examiner* — Kara M Peo

(57) ABSTRACT

An arrangement for mounting components in a heating chamber for heating a fluid of a fluid separation apparatus, wherein the arrangement comprises a mounting board having at least one mounting recess each configured for accommodating at least one component, and the at least one component each configured to be mountable in and/or on the at least one mounting recess.

20 Claims, 11 Drawing Sheets

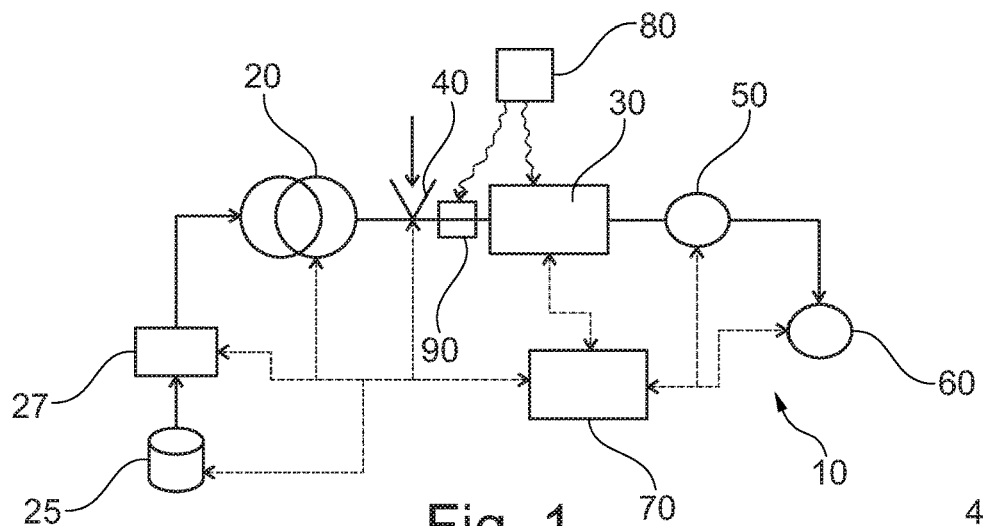
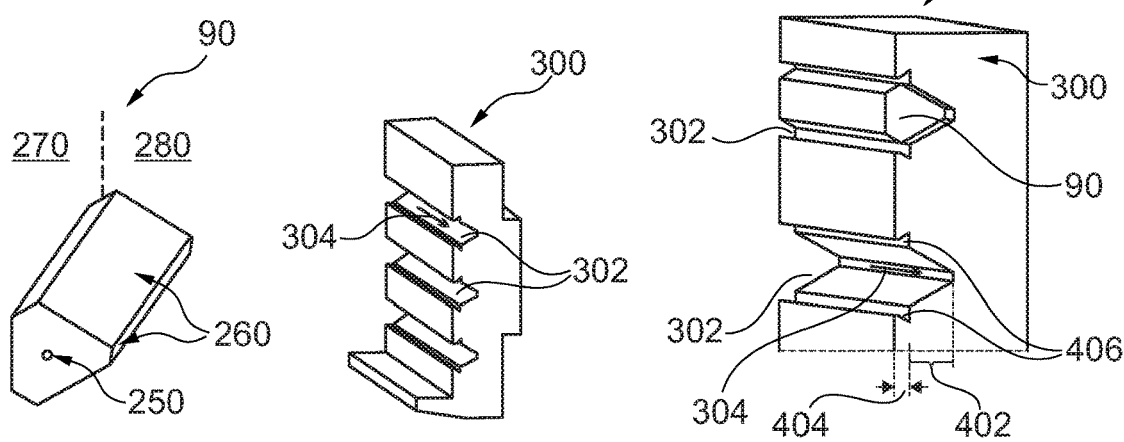
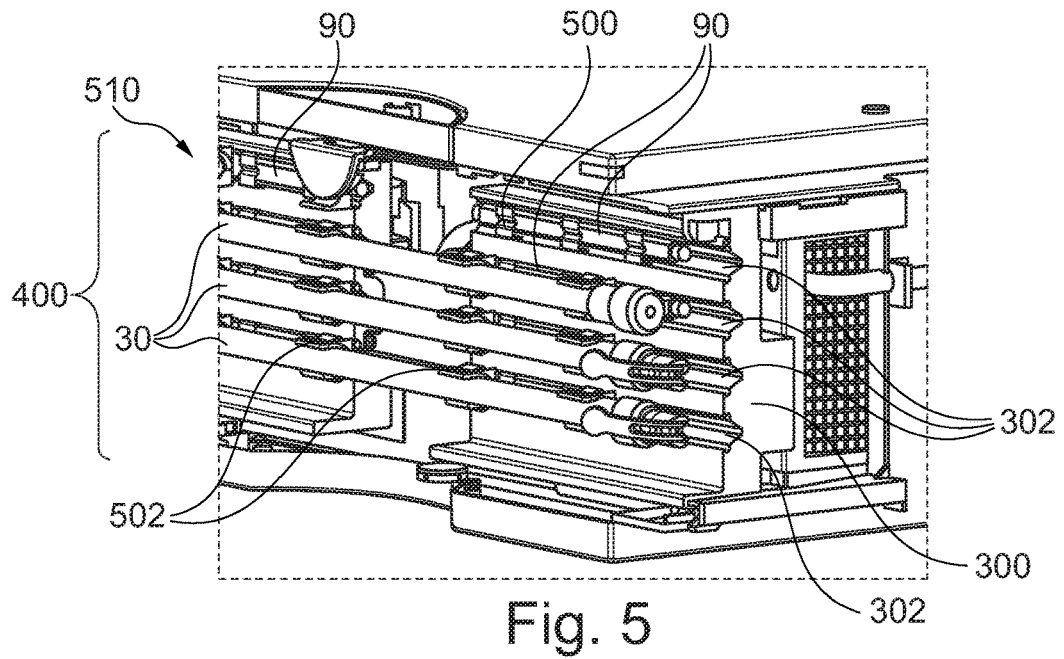

MODULAR MOUNTING SYSTEM FOR COMPONENTS OF HEATING CHAMBER

BACKGROUND ART

The present application claims priority under 35 U.S.C. § 119(e) from United Kingdom Patent Application No. 1400500.3 filed on Jan. 13, 2014 naming Ansgar Waldbaur, et al. as inventors. The entire disclosure of United Kingdom Patent Application No. 1400500.3 is specifically incorporated herein by reference.

The present invention relates to an arrangement for mounting components in a heating chamber for heating a fluid of a fluid separation apparatus, to a heating chamber, to a fluid separation apparatus, and to a method of mounting components in a heating chamber for heating a fluid of a fluid separation apparatus.

In liquid chromatography, a fluid (such as a mixture between a fluidic sample and a mobile phase) may be pumped through conduits and a column comprising a material (stationary phase) which is capable of separating different components of the fluidic sample. Such a material, so-called beads which may comprise silica gel, may be filled into a column which may be connected to other elements (like a sampling unit, a flow cell, containers including sample and/or buffers) by conduits.

For operating a fluid separation apparatus, the fluid can be pre-heated in a heating chamber by a pre-heater assembly located downstream of an injector for injecting the fluidic sample in the mobile phase and upstream of the column.

GB 2432800 discloses a chromatographic system and method which include a passive pre-heater assembly. A fluid mixture is supplied from an injector to the pre-heater assembly and then to a chromatographic column having an active heating source. The pre-heater assembly includes a convoluted tube with first and second ends and a fluid passage extending centrally therebetween, first and second end fittings attached respectively to the first and second ends of the convoluted tube, and a thermally conductive film attached to an outer surface of the convoluted tube. The first end fitting is adapted for fluidly connecting the first end of the convoluted tube to the injector and the second end fitting is adapted for fluidly connecting the second end of the convoluted tube to the chromatographic column. The thermally conductive film conveys heat from an active heating source of a chromatographic column to the convoluted tube when the pre-heater assembly is positioned adjacent to the active heating source. The central fluid passage in the convoluted tube has a series of bends which function to create a secondary fluid flow field that is substantially orthogonal to a primary flow field established when fluid is traversing the fluid passage in the tube.

However, when the fluid is pre-heated prior to performing the separation in the fluid separation apparatus and the separation unit is heated as well, it is a challenge for a user to properly mount the various components required for the pre-heating and the column heating within the heating chamber so that an efficient heating occurs in accordance with user preferences.

DISCLOSURE

It is an object of the invention to enable a flexible management of various components in a heating chamber in a user-convenient manner and with an efficient heating performance.

According to an exemplary embodiment of the present invention, an arrangement for mounting components in a heating chamber for heating a fluid of a fluid separation apparatus is provided, wherein the arrangement comprises a mounting board having at least one mounting recess (in particular a plurality of mounting recesses) each configured for accommodating at least one component (in particular for accommodating a plurality of components), and the at least one component (in particular a plurality of components) each configured to be mountable in and/or on the at least one mounting recess.

According to another exemplary embodiment of the present invention, a heating chamber for heating a fluid of a fluid separation apparatus is provided, wherein the heating chamber comprises an arrangement having the above mentioned features.

According to another exemplary embodiment, a fluid separation apparatus for separating a fluidic sample into a plurality of fractions is provided, wherein the apparatus comprises a fluid drive unit configured for driving a fluid comprising a mobile phase and the fluidic sample in the mobile phase, and a separation unit configured for separating the fluidic sample into the plurality of fractions. The apparatus further comprises an arrangement having the above mentioned features for heating the fluid upstream of and/or in the separation unit, and/or a heating chamber having the above mentioned features for heating the fluid upstream of and/or in the separation unit.

According to still another exemplary embodiment, a method of mounting components in a heating chamber for heating a fluid of a fluid separation apparatus is provided, wherein the method comprises providing a mounting board having at least one mounting recess each configured for accommodating at least one component, and mounting the at least one component in and/or on the at least one mounting recess.

According to an exemplary embodiment, the flexibility and user convenience of an assembly in a heating chamber is significantly improved over conventional approaches by rendering it much more flexible for a user, more user convenient, and better in terms of heat transfer efficiency and heat transfer controllability. This is achieved by providing an arrangement of a thermally conductive mounting board delivering heat and having one or more mounting recesses being universally usable for flexibly and reversibly accommodating different components thereon and/or therein at freely selectable positions and in freely selectable combinations. Thus, a construction set for arranging components (such as pre-heater assemblies for pre-heating fluids, separation units for separating fluids, holders for holding such or other fluidic members) in a user specific and application-specific manner is provided. Mounting such components in mounting recesses ensures a precisely controllable heat transfer from the mounting board to the components when the components are for instance arranged in intimate contact and deep within the mounting recesses (to thereby adjust a strong heat transfer dominated by heat conduction) or spaced by a holder or the like adjacent to the mounting recesses (to thereby adjust a homogeneous heat transfer dominated by heat convection).

In the following, further embodiments of the arrangement, the heating chamber, the fluid separation apparatus, and the method will be explained.

In an embodiment, the at least one component to be mounted on and/or in the at least one mounting recess comprises a pre-heater assembly for heating the fluid upstream of a separation unit of the fluid separation apparatus. Such a pre-heater assembly can be configured as a physical body accommodating a capillary through which the fluid is to be conducted which is to be pre-heated. For an efficient pre-heating of the fluid, an external surface of the pre-heater assembly has to be heated by thermal energy from a heat source. By arranging the pre-heater assembly within the mounting recess, preferably with a direct physical contact between an exterior surface of the pre-heater assembly and an internal surface of the mounting recess of the mounting board, the mounting board being heated by the heat source can efficiently transfer the heat energy dominated by heat conduction towards the pre-heater assembly and from there to the fluid.

In an embodiment, the pre-heater assembly comprises a capillary having a lumen and being configured for conducting the fluid and a thermal coupling body contacting at least part of the capillary and being arrangable so that heat generated by a heat source is supplied to the capillary via at least part of the thermal coupling body. The thermal coupling body and the recess may be shaped to correspond to one another so that mounting the pre-heater assembly in the accommodation recess can be accomplished by a form closure, thereby promoting a very efficient heat transfer from the mounting board to the pre-heater assembly.

In an embodiment, the thermal coupling body has a value of the thermal conductivity in a range between approximately 8 W/(m K) and approximately 100 W/(m K). According to an exemplary embodiment, a capillary for conducting a fluid is surrounded by a thermal coupling body having a comparatively (i.e. in comparison to conventionally used thermal coupling bodies of aluminum or the like) small thermal conductivity, but still showing a thermal conductivity which is by far better than that of thermal insulators. With such a moderately thermally conductive thermal coupling body, it is surprisingly possible to pre-heat the flowing fluid in a particularly efficient way making use of a heat transfer via the thermal coupling body. This intended pre-heating can be achieved by heat conduction between a heat source and an external exposed surface of the thermal coupling body. Surprisingly, the implementation of a thermal coupling body with an only moderate thermal conductivity shows an improved pre-heating performance as compared to a highly thermally conductive material such as aluminum. Without wishing to be bound to a specific theory, it is presently believed that the reason for this behavior is that apart from the flow of thermal energy from the heat source through the thermal coupling body to the fluid within the capillary there is another—parasitic—heat flow path which has to be taken into account as well. This parasitic heat flow path is due to heat conduction between different sections of the fluid in the capillary and via adjacent material of the thermal coupling body. The fluid is heated while traversing the pre-heater assembly. However, hotter fluid sections have the tendency to heat cooler fluid sections and will therefore lose temperature to thereby equilibrate the spatial temperature distribution within the flowing fluid. This occurs by heat conduction from hotter downstream sections of the fluid towards cooler upstream sections of the fluid. This heat flow is parasitic since it tends to foil the desired heat flow from the heat source via the thermal coupling body through the capillary into the fluid. It has turned out that by using a material with a moderate thermal conductivity for the thermal coupling body, the efficiency of the desired heat flow might be slightly reduced, but the parasitic heat flow is even more efficiently suppressed. It has turned out that the net effect of the use of a material for the thermal coupling body with a thermal conductivity between about 8 W/(m K) and about 100 W/(m K) such as the use of an appropriate plastic-based thermal coupling body improves the overall performance of the pre-heater assembly because the dramatic suppression of the parasitic heat flow overcompensates the only slight deterioration of the desired heat flow. Moreover, using a plastic thermal coupling body allows for a simple manufacturability (for instance by molding) and an embedding of the capillary by an encapsulant forming the thermal coupling body, further promoting the thermal coupling within the pre-heater assembly.

In an embodiment, the thermal coupling body is constituted by a molding compound or a casting compound. Hence, the thermal coupling body is formed by overmolding or overcasting the capillary. The molding compound can be of a plastic or a ceramic material, for instance. The casting compound may be a moderately thermally conductive metal (such as steel), for instance. However, in other embodiments, also properly thermally conductive metals such as copper or aluminium may be used for casting. Both overmolding and overcasting ensures an intimate heat coupling between capillary and thermal coupling body.

In an embodiment, the pre-heater assembly has an external shape which is configured to substantially correspond to an internal shape of the at least one mounting recess so that, when the pre-heater assembly is mounted in the at least one mounting recess, an internal surface of the mounting recess is substantially covered by the external surface of the pre-heater assembly. By matching the mating surfaces of the mounting board and the pre-heater assembly to correspond to one another an efficient heat transfer is ensured. However, in view of considerations concerning production of the pre-heater assembly and the mounting board, there may remain a gap or some clearance between a lowermost section of the pre-heater assembly and a lowermost section of the mounting recess. Such a small gap is advantageous in order to ensure that the lateral surfaces of the pre-heater assembly fully contact corresponding lateral surfaces of the mounting board in the respective mounting recess. From the point of view of production technology, it is difficult, in view of manufacturing tolerances, to ensure that three surfaces of the pre-heater assembly precisely and fully contact counter surfaces of the mounting board. Therefore, such a gap is advantageous to prevent insufficient thermal coupling between the pre-heater assembly and the mounting board.

In an embodiment, one of the at least one component is a holder configured for holding another one of the at least one component. Such a holder may be a separation unit holder configured for holding a separation unit for separating the fluid in the fluid separation apparatus. Such a holder may also be a pre-heater assembly holder for holding a pre-heater assembly for pre-heating the fluid in the fluid separation apparatus. In one and the same heating chamber, heating of one or more pre-heater assemblies and one or more separation units (such a separation columns) is possible. Preferably, such separation units are not mounted directly in the mounting recess but indirectly via a (for instance separate) holder. The holder may be made of a thermally poorly conductive material so that the separation units are dominantly heated indirectly by heat convection rather than heat conduction. This allows for a very homogeneous heating of the separation units which improves its performance and the reproducibility of the separation characteristics. However, alternatively, the separation unit may also be mounted directly on the mounting recesses, or the holders may be made of a thermally conductive material if a stronger heat transfer is desired. When the holder is a pre-heater assembly holder for holding a pre-heater assembly, the holder may be integrally formed with the pre-heater assembly or may be provided separately from the pre-heater assembly.

In an embodiment, the arrangement further comprises a heat source, in particular a Peltier heat source, configured for generating heat for heating the mounting board. Such a heat source may be integrally formed with the mounting board or may be provided separately.

In an embodiment, the heat source is attached to a backside of the mounting board opposing a front side at which the at least one mounting recess is arranged. For instance, mounting such a heat source directly on a plate shaped mounting board at one main surface thereof opposing another main surface at which the mounting recesses are formed allows to efficiently use available space to obtain a compact arrangement. At the same time, the heat conduction paths are short so that an efficient heat transfer to components mounted at the mounting recess is possible.

In an embodiment, the mounting board is made of a material having a value of the thermal conductivity of at least approximately 150 W/(m K), in particular comprises or consists of aluminum or copper. Such an aluminum or copper block may heat the air in the heat chamber so that not only a heat conductive heat transfer but also a heat convective heat transfer is possible. In particular, the thermal conductivity of the mounting board may be better than the thermal conductivity of a corresponding pre-heater assembly.

In an embodiment, the at least one mounting recess is configured as at least one mounting groove within the, in particular substantially plate-shaped, mounting board. In such an embodiment, the mounting recess is positioned within an interior of the plate shaped mounting board, i.e. does not protrude beyond it. Therefore, there is an extremely efficient heat flow due to the close spatial neighbourship between the mounted component and the board.

In an embodiment, the at least one mounting recess comprises an interior recess section configured for accommodating a first component and comprises an exterior recess section arranged between the interior recess section and a surrounding of the mounting plate and being configured for accommodating a second component. Such an arrangement is extremely compact, since two sections of one and the same mounting recess can be used for mounting two components at the same time and independently from one another. For example, a V-shaped groove as interior recess section may be superposed by a dovetail shaped groove as exterior recess section, in order to form together the mounting recess.

In an embodiment, the interior recess section has slanted surfaces (in particular enclosing an angle of less than 90° in between), in particular is substantially V-shaped, more particularly is equilateral triangular. The provision of a groove shaped like this allows for a mounting of an inverse shaped pre-heater assembly with a very small mounting pressure and a very efficient thermal coupling. In particular, the combination of a V-shaped groove (in a cross-sectional view) and a V-shaped pre-heating assembly (in a cross-sectional view) provides an intuitive guidance when inserting the pre-heating assembly into the mounting groove.

In an embodiment, the exterior recess section has an undercut, in particular one of a dovetail-type undercut, a triangular undercut, and a T-shaped undercut. Such an undercut allows to mount a component such as a holder by inserting it into the exterior recess section and subsequently turning it so as to engage a radially outermost portion of the holder with the undercut.

In an embodiment, the pre-heater assembly is substantially shaped as a regular prism with a triangular base surface, in particular with an equilateral triangular base surface (i.e. a triangle having three angles of each). In this context, the term "prism" may denote a body with an n-sided polygonal base surface (n may for instance be 3, 4 5, or 6), a translated copy of the n-sided polygonal base surface in another plane as the first n-sided polygonal base surface, and n other surfaces configured as rectangles joining corresponding sides of the two base surfaces. Geometrically, all cross-sections parallel to the base surfaces are the same. Such a base surface may be a flange surface. More precisely, two opposing flange faces may be arranged as base surfaces at two opposing ends of the prism-shaped pre-heater assembly. The capillary may exit the thermal coupling body at each of the two bases surfaces. With such a configuration, two of three mutually slanted surfaces of the pre-heater assembly extending perpendicular to the base surfaces can be brought in direct physical contact with walls delimiting a correspondingly shaped recess in a mounting board for a pronounced thermal heat transfer from the heat source via the board to the thermal coupling body of the pre-heater assembly.

Although a prism with triangular base surfaces corresponding to three planar side faces is particularly advantageous in view of its very good guiding and fitting characteristics when being mounted with form closure in an inverse shaped groove (V-shaped groove) of the mounting board and provides remarkably good thermal coupling characteristics with the board while showing only small heat losses at an exposed outer surface, other shapes of the thermal coupling body are possible as well (for instance circular, semi-circular, or rectangular base surfaces).

In an embodiment, the interior recess section, the exterior recess section, the first component and the second component are configured to match to one another so that the second component is mountable within the exterior recess section while the first component is mounted in the interior recess section. This allows for a specifically efficient use of the available volume.

In an embodiment, the first component is a pre-heater assembly and the second component is a fastening element for fastening the pre-heater assembly to the mounting recess. In such an embodiment, the pre-heater assembly can be simply placed into an interior section of the mounting recess. The actual fastening procedure can then be accomplished by a fastening element which may be (permanently or temporarily) attached to the pre-heater assembly and fastened in the exterior recess section of the mounting recess. This allows for a very easy mounting procedure which can be carried out with or without the use of a tool and which is reversible, i.e. also supports simple dismounting.

In another embodiment, the first component is a pre-heater assembly and the second component is a separation unit holder for holding a separation unit for separating the fluid in the fluid separation apparatus. A first component (in particular a pre-heating assembly) can be mounted close to or at a bottom of the mounting recess for a very pronounced heat transfer between mounting board and component. A second component (in particular a holder for holding a separation unit) can also be mounted in the mounting recess, but further away from the bottom thereof, so that the heat coupling with the separation unit can be rendered intentionally weaker. In fact, the separation unit may be mounted so as to be located outside of the mounting recess, while its holder may engage into the mounting recess.

In an embodiment, the at least one mounting recess has a mounting profile shaped constantly along an entire extension of the at least one mounting recess. Therefore, a rail-like architecture may be provided in which also multiple components may be mounted in one and the same mounting recess next to one another. The constant shape of the mounting profile along its mounting extension renders the position at which a mounting procedure is carried out selectable by a user.

In an embodiment, the at least one mounting recess extends along a horizontal direction. Therefore, a first dimension of a plate shaped mounting board can be used for mounting multiple components along a row.

In an embodiment, the mounting board is configured as a vertically extending substantially plate-shaped body. In such a vertically extending mounting board the heat will flow in an upwards direction. Such a plate shaped body may be equipped with a fin extending horizontally only at a bottom surface, since the hot air moves upwardly.

In an embodiment, the arrangement further comprises a fastening element configured for fastening the component in the mounting recess. Such a fastening element may be configured to be twistably actuable (i.e. actuable by turning) for fastening the component in the mounting recess by twisting the fastening element after insertion of the component into the mounting recess. In case the fastening element is not rotationally symmetric, a simple twisting by a certain angle of for instance 90° is sufficient for fastening the component by triggering an engagement of the fastening element in an undercut section of the mounting recess. The fastening element may be configured in combination with the undercut of the mounting recess so that the user receives a haptic feedback upon completion of the fastening procedure. The fastening element may be integrally formed with the component to be fastened (for instance a pre-heater assembly) and may be arranged at an external surface of the component (for instance the thermal coupling body of a pre-heater assembly).

In an embodiment, the fastening element is configured for fastening the component in the mounting recess by attaching the component to the mounting recess and subsequently actuating the fastening element to thereby fasten the fastening element in an undercut section of the mounting recess. For example, the fastening element may be configured as a twist lock clip being lockable into an undercut of the mounting recess by turning. This can be done by using a tool (such as a screw driver or a bolt, such as a hexagonal bolt) or without any tools. This is very simple and user-friendly procedure which can be simply inversed for dismounting the component.

The separation unit may be filled with a separating material. Such a separating material which may also be denoted as a stationary phase may be any material which allows an adjustable degree of interaction with a sample fluid so as to be capable of separating different components of such a sample fluid. The separating material may be a liquid chromatography column filling material or packing material comprising at least one of the group consisting of polystyrene, zeolite, polyvinylalcohol, polytetrafluoroethylene, glass, polymeric powder, silicon dioxide, and silica gel, or any of above with chemically modified (coated, capped etc) surface. However, any packing material can be used which has material properties allowing an analyte passing through this material to be separated into different components, for instance due to different kinds of interactions or affinities between the packing material and fractions of the analyte.

At least a part of the separation unit may be filled with a fluid separating material, wherein the fluid separating material may comprise beads having a size in the range of essentially 1 μm to essentially 50 μm. Thus, these beads may be small particles which may be filled inside the separation section of the microfluidic device. The beads may have pores having a size in the range of essentially 0.01 μm to essentially 0.2 μm. The fluidic sample may be passed through the pores, wherein an interaction may occur between the fluidic sample and the pores.

The separation unit may be a chromatographic column for separating components of the fluidic sample. Therefore, exemplary embodiments may be particularly implemented in the context of a liquid chromatography apparatus.

The fluid separation system may be configured to conduct a liquid mobile phase through the separation unit. As an alternative to a liquid mobile phase, a gaseous mobile phase or a mobile phase including solid particles may be processed using the fluid separation system. Also materials being mixtures of different phases (solid, liquid, gaseous) may be processed using exemplary embodiments. The fluid separation system may be configured to conduct the mobile phase through the system with a high pressure, particularly of at least 600 bar, more particularly of at least 1200 bar.

The fluid separation system may be configured as a microfluidic device. The term "microfluidic device" may particularly denote a fluid separation system as described herein which allows to convey fluid through microchannels having a dimension in the order of magnitude of less than 500 μm, particularly less than 200 μm, more particularly less than 100 μm or less than 50 μm or less.

Exemplary embodiments may be implemented in a sample injector of a liquid chromatography apparatus which sample injector may take up a sample fluid from a fluid container and may inject such a sample fluid in a conduit for supply to a separation column. During this procedure, the sample fluid may be compressed from, for instance, normal pressure to a higher pressure of, for instance several hundred bars or even 1000 bar and more. An autosampler may automatically inject a sample fluid from the vial into a sample loop. A tip or needle of the autosampler may dip into a fluid container, may suck fluid into the capillary and may then drive back into a seat to then, for instance via a switchable fluidic valve, inject the sample fluid towards a sample separation section of the liquid chromatography apparatus.

The fluid separation system may be configured to analyze at least one physical, chemical and/or biological parameter of at least one component of the sample fluid in the mobile phase. The term "physical parameter" may particularly denote a size or a temperature of the fluid. The term "chemical parameter" may particularly denote a concentration of a fraction of the analyte, an affinity parameter, or the like. The term "biological parameter" may particularly denote a concentration of a protein, a gene or the like in a biochemical solution, a biological activity of a component, etc.

The fluid separation system may be implemented in different technical environments, like a sensor device, a test device, a device for chemical, biological and/or pharmaceutical analysis, a capillary electrophoresis device, a liquid chromatography device, a gas chromatography device, an electronic measurement device, or a mass spectroscopy device. Particularly, the fluid separation system may be a High Performance Liquid Chromatography (HPLC) device by which different fractions of an analyte may be separated, examined and analyzed.

An embodiment of the present invention comprises a fluid separation system configured for separating compounds of a sample fluid in a mobile phase. The fluid separation system comprises a mobile phase drive, such as a pumping system, configured to drive the mobile phase through the fluid separation system. A separation unit, which can be a chromatographic column, is provided for separating compounds of the sample fluid in the mobile phase. The fluid separation system may further comprise a sample injector configured to introduce the sample fluid into the mobile phase, a detector configured to detect separated compounds of the sample fluid, a collector configured to collect separated compounds of the sample fluid, a data processing unit configured to process data received from the fluid separation system, and/or a degassing apparatus for degassing the mobile phase.

Embodiments of the present invention might be embodied based on most conventionally available HPLC systems, such as the Agilent 1290 Series Infinity system, Agilent 1200 Series Rapid Resolution LC system, or the Agilent 1100 HPLC series (all provided by the applicant Agilent Technologies—see www.agilent.com—which shall be incorporated herein by reference).

One embodiment comprises a pumping apparatus having a piston for reciprocation in a pump working chamber to compress liquid in the pump working chamber to a high pressure at which compressibility of the liquid becomes noticeable. One embodiment comprises two pumping apparatuses coupled either in a serial (e.g. as disclosed in EP 309596 A1) or parallel manner.

The mobile phase (or eluent) can be either a pure solvent or a mixture of different solvents. It can be chosen e.g. to minimize the retention of the compounds of interest and/or the amount of mobile phase to run the chromatography. The mobile phase can also been chosen so that the different compounds can be separated effectively. The mobile phase might comprise an organic solvent like e.g. methanol or acetonitrile, often diluted with water. For gradient operation water and an organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid might compose any type of process liquid, natural sample like juice, body fluids like plasma or it may be the result of a reaction like from a fermentation broth.

The fluid is preferably a liquid but may also be or comprise gas and/or a supercritical fluid (as e.g. used in supercritical fluid chromatography—SFC—as disclosed e.g. in U.S. Pat. No. 4,982,597 A).

The pressure in the mobile phase might range from 2-200 MPa (20 to 2000 bar), in particular 10-150 MPa (100 to 1500 bar), and more particularly 50-120 MPa (500 to 1200 bar).

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

FIG. 1 shows a liquid separation device in accordance with embodiments of the present invention, particularly used in high performance liquid chromatography (HPLC).

FIG. 2 is a three-dimensional view of a pre-heater assembly as a component to be mounted in a mounting recess of an arrangement according to an exemplary embodiment of the invention.

FIG. 3 is a three-dimensional view of a mounting board of an arrangement for mounting components in a heating chamber for heating a fluid of a fluid separation apparatus according to an exemplary embodiment of the invention.

FIG. 4 is a three-dimensional view showing the pre-heater assembly of FIG. 2 mounted in one of mounting recesses of the mounting board of FIG. 3.

FIG. 5 illustrates a heating chamber with an arrangement for mounting components therein according to an exemplary embodiment, wherein a pre-heater assembly is mounted in a mounting recess fastened with a fastening element and wherein separation units for separating fluid are held in holders which are, in turn, mounted in mounting recesses.

Figure 6:
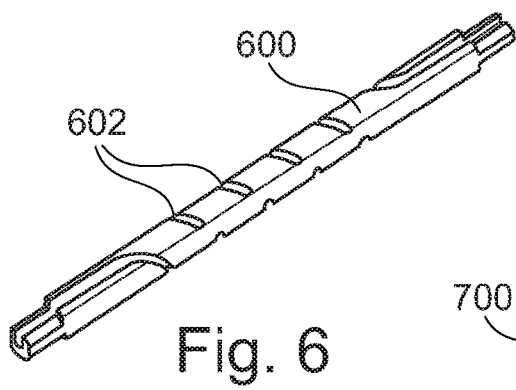
FIG. 6 to FIG. 9 show different three-dimensional views of structures obtained during carrying out a method of manufacturing a pre-heater assembly of an arrangement according to an exemplary embodiment of the invention.

The illustration in the drawing is schematic.

Before referring to the figures, exemplary embodiments will be explained in further detail, and some basic considerations will be explained based on which exemplary embodiments have been developed.

According to an exemplary embodiment, an arrangement having a mounting board with mounting recesses which may be configured as a V-shaped groove fixture (preferably equipped with a dovetail shaped exterior section) inside a heating chamber or column department is provided.

Conventional concepts of mounting pre-heater assemblies and separation units such as columns for a fluid separation apparatus like a liquid chromatography apparatus lack flexibility and thermal efficiency. In order to improve such conventional concepts, exemplary embodiments of the invention provide a flexible board-based arrangement on which the user can freely mount components such as separation units (for instance columns or the like) without the need to use tools for mounting. Components like for instance pre-heater assemblies (as pre-column heat exchangers) can be placed inside mounting recesses such as mounting grooves in a mounting board without sacrificing space for accommodating separation units. A mounting recess in which the pre-heater assemblies are placed is thermally very efficient at better usability and less risk of misplacement.

According to an exemplary embodiment of a mounting method, separation units (such as columns) are fixed in place. No tools are necessary to mount. A mounting recess can be configured as a V-groove, in particular with a triangular cross section, which allows for two faces to be pressed against their counterpart in the back wall with comparably little force necessary. Compared to other shapes, misalignment or incorrect placement (causing insulating air gaps) by the user is not possible with a V-shaped groove. A V-groove fixture allows a very stable design which grants robustness as well as enough space for standard fittings. As heat goes up, placement inside (as opposed to mount mounting in front of) the back wall is advantageous for heat exchange. Because the pre-heater assembly should be sufficiently small in order to meet requirements concerning the critical surface area needed to generate enough heat to heat the separation units themselves, the triangle shape may be adjusted by means of two chamfers. This allows the pre-heater assembly to optionally loom into the dovetail groove while still enabling the installation of separation unit holders (such as fixture clamps for columns or the like). Due to this design, the heat transfer properties of the mounting board (such as an aluminum body) are improved. When placed into the mounting recesses, a gap may appear between the very back of the pre-heater assembly and the mounting recess preferably configured as V-groove. Although this gap will inevitably fill with air it is advantageous in order to guarantee proper contact of the upper and lower back sides of the pre-heater assembly. As a valve in the center of a heating chamber moves with capillaries connected, fittings can be placed inside the groove.

Referring now in greater detail to the drawings, FIG. 1 depicts a general schematic of a liquid separation system 10. A pump 20 receives a mobile phase from a solvent supply 25, typically via a degasser 27, which degases and thus reduces the amount of dissolved gases in the mobile phase. The pump 20—as a mobile phase drive—drives the mobile phase through a separating device 30 (such as a chromatographic column) comprising a stationary phase. A sampling unit 40 can be provided between the pump 20 and the separating device 30 in order to subject or add (often referred to as sample introduction) a sample fluid into the mobile phase. The stationary phase of the separating device 30 is configured for separating compounds of the sample liquid. A detector 50 is provided for detecting separated compounds of the sample fluid. A fractionating unit 60 can be provided for outputting separated compounds of the sample fluid.

While the mobile phase can be comprised of one solvent only, it may also be mixed from plural solvents. Such mixing might be a low pressure mixing and provided upstream of the pump 20, so that the pump 20 already receives and pumps the mixed solvents as the mobile phase. Alternatively, the pump 20 might be comprised of plural individual pumping units, with plural of the pumping units each receiving and pumping a different solvent or mixture, so that the mixing of the mobile phase (as received by the separating device 30) occurs at high pressure and downstream of the pump 20 (or as part thereof). The composition (mixture) of the mobile phase may be kept constant over time, the so called isocratic mode, or varied over time, the so called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the pump 20 (e.g. setting control parameters) and receive therefrom information regarding the actual working conditions (such as output pressure, flow rate, etc. at an outlet of the pump 20). The data processing unit 70 might also control operation of the solvent supply 25 (e.g. setting the solvent/s or solvent mixture to be supplied) and/or the degasser 27 (e.g. setting control parameters such as vacuum level) and might receive therefrom information regarding the actual working conditions (such as solvent composition supplied over time, flow rate, vacuum level, etc.). The data processing unit 70 might further control operation of the sampling unit 40 (e.g. controlling sample injection or synchronization of sample injection with operating conditions of the pump 20). The separating device 30 might also be controlled by the data processing unit 70 (e.g. selecting a specific flow path or column, setting operation temperature, etc.), and send in return information (e.g. operating conditions) to the data processing unit 70. Accordingly, the detector 50 might be controlled by the data processing unit 70 (e.g. with respect to spectral or wavelength settings, setting time constants, start/stop data acquisition), and send information (e.g. about the detected sample compounds) to the data processing unit 70. The data processing unit 70 might also control operation of the fractionating unit 60 (e.g. in conjunction with data received from the detector 50) and provide data back.

FIG. 1 also shows a heat source 80 for generating thermal energy, i.e. heat, and can for instance be embodied as a Peltier heater or an ohmic heater. The heat source 80, in the shown embodiment, fulfils two tasks. Firstly, the heat source 80 heats a pre-heater assembly 90 according to an exemplary embodiment by heat conduction, wherein the pre-heater assembly 90, in turn, pre-heats fluid downstream of the injector 40 and upstream of the separating device 30. Secondly, the heat source 80 heats the separating device 30 by heat convection, wherein the separating device 30, in turn, heats the fluid within the separating device 30.

FIG. 2 is a three-dimensional view of a, in a cross-sectional view substantially triangularly shaped or V-shaped, pre-heater assembly 90 as a component to be mounted in a mounting recess 302 (see FIG. 3) to thereby form part of an arrangement 400 (see FIG. 4) according to an exemplary embodiment of the invention. A position at which a capillary interface may be formed is denoted with reference numeral 250. The heat transfer is accomplished by surfaces 260 of the pre-heater assembly 90. At a front side, denoted with reference numeral 270, separation units such as columns may be placed. At a backside, see reference numeral 280, the pre-heater assembly 90 may be placed inside a mounting board 300 (see FIG. 3).

FIG. 3 is a three-dimensional view of the mounting board 300 of the arrangement 400 for mounting components in a heating chamber for heating a fluid of fluid separation apparatus 10 according to an exemplary embodiment of the invention. In the shown embodiment, the mounting board 300 consists of aluminum. The mounting recesses 302 are configured as mounting grooves within the substantially plate-shaped, mounting board 300. All mounting recesses 302 of the mounting board 300 extend with identical shape along a horizontal extension direction 304. The mounting board 300 is configured as a vertically extending substantially plate-shaped body.

FIG. 4 is a three-dimensional view showing the pre-heater assembly 90 of FIG. 2 mounted in the mounting recess 302 of the mounting board 300 of FIG. 3. The mounting recesses 302 each comprise an interior recess section 402 configured for accommodating a pre-heater assembly 90, and an exterior recess section 404 arranged between the interior recess section 402 and a surrounding of the mounting board 300 and being configured for accommodating for instance a fastening element (not shown in FIG. 4) for fastening the pre-heater assembly 90 in the mounting recess 302.

Hence, FIG. 2 to FIG. 4 illustrate an arrangement 400 for mounting components (such as pre-heater assembly 90) in a heating chamber (see FIG. 5) for heating a fluid of a fluid separation apparatus 10. The arrangement 400 comprises the mounting board 300 having the mounting recesses 302 each configured for accommodating one or more components (such as pre-heater assembly 90 for heating the fluid upstream of separation unit 30 of the fluid separation apparatus 10), and the component(s) configured to be mountable in and/or on the mounting recesses 302. As can be taken from FIG. 4, the pre-heater assembly 90 has an external shape which is configured to substantially correspond to an internal shape of the at least one mounting recess 302 so that, when the pre-heater assembly 90 is mounted in a corresponding mounting recess 302, an internal surface of the mounting recess 302 is substantially covered by the external surface of the pre-heater assembly 90.

Figure 11:
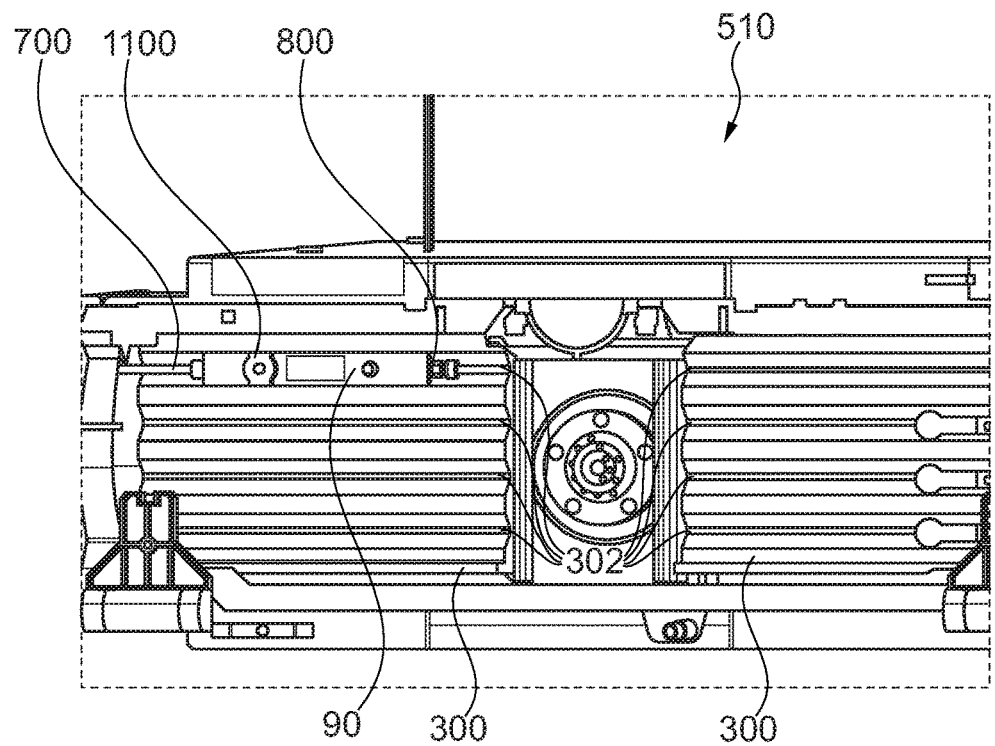
FIG. 11 illustrates a detail of and FIG. 12 illustrates an entire heating chamber of a fluid separation apparatus according to an exemplary embodiment of the invention, wherein the heating chamber is configured for heating a fluid separated by the fluid separation apparatus and comprises a pre-heater assembly mounted in a mounting recess of a mounting board of the heating chamber.

FIG. 5 illustrates a heating chamber 510 with an arrangement 400 for mounting components according to an exemplary embodiment, wherein pre-heater assemblies 90 are mounted in mounting recesses 302 and are fastened with a separate fastening element 500 (many alternative fastening techniques for fastening pre-heater assemblies 90 may be applied, compare for instance the integrally formed fastening architecture according to reference numeral 1100 in FIG. 11). Separation units 30 for separating fluid are held in separation unit holders 502 which are, in turn, mounted in mounting recesses 302. In the shown embodiment, the fastening element 500 (or holder) is configured as a spring-like clip which can be clipped into the exterior recess section 404 after having inserted the pre-heater assembly 90 into the interior recess section 402 for fastening the pre-heater assembly 90 into the mounting recess 302.

The separation unit holders 502 are configured for holding separation units 30 for separating the fluid in the fluid separation apparatus 10. The separation unit holders 502 are mounted in the mounting recess 302, in particular in the exterior recess sections 404. Preferably after the mounting of the separation unit holders 502 at the mounting board 300, the separation units 30 may be simply pushed or plugged into accommodation sections of the separation unit holders 502 to be held there for instance by a spring force or a friction force. It can also be seen in FIG. 5 that the shown mounting concept is compatible with a mounting of a pre-heater assembly 90 in the same mounting recess 302 as a simultaneously present separation unit 30.

FIG. 6 to FIG. 9 show different three-dimensional views of structures obtained during carrying out a method of manufacturing a pre-heater assembly 90 of an arrangement 400 according to an exemplary embodiment of the invention.

FIG. 6 shows a carrier 600 which may for instance be made of a material such as plastic or a metal. The carrier 600 is rod-shaped and comprises a circumferentially running groove 602 serving as a guide and an accommodation for a capillary 700 (see FIG. 7) to be wound around the carrier 600.

Figure 7:
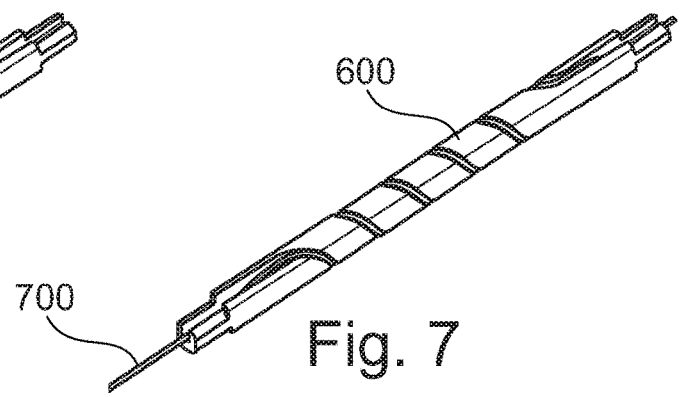

FIG. 7 shows the carrier 600 with the capillary 700 wound around an exterior surface of the carrier 600. More precisely, the capillary 700 is guided along and, accommodated within the groove 602 so as to precisely define the trajectory of the capillary 700 in the pre-heater assembly 90 to be manufactured.

Figure 8:
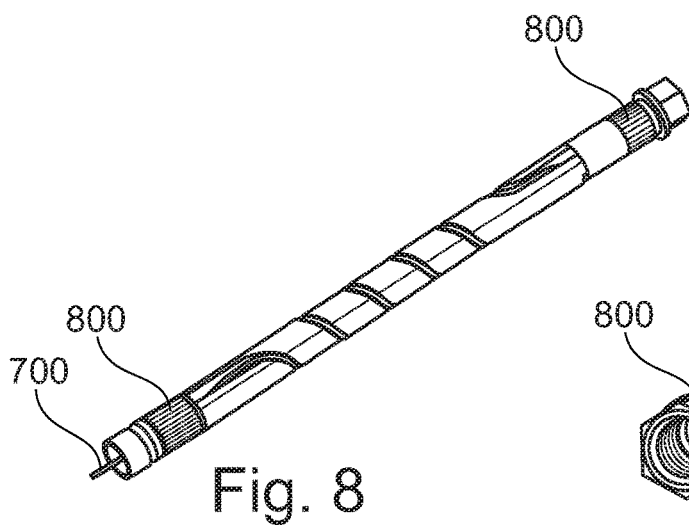
Figure 9:
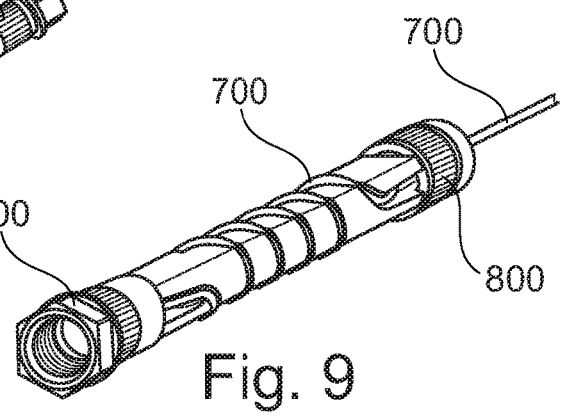

FIG. 8 and FIG. 9 show the arrangement of FIG. 7 with fittings 800 attached to both opposing ends of the carrier 600. These opposing ends are correspondingly shaped to receive the fittings 800 (which are here configured as female fittings). A female fitting is particularly advantageous in view of its high robustness. However, also a fitting free configuration at least on one end of the pre-heater assembly to be manufactured may be advantageous in order to achieve a very low dispersion, resulting in a highly accurate chromatographic analysis. Via the fittings 800, the capillary 700 may be fluidically connected to another fluidic member (such as a fluidic valve, a separating device 30, an injector 40, etc.).

Figure 10:
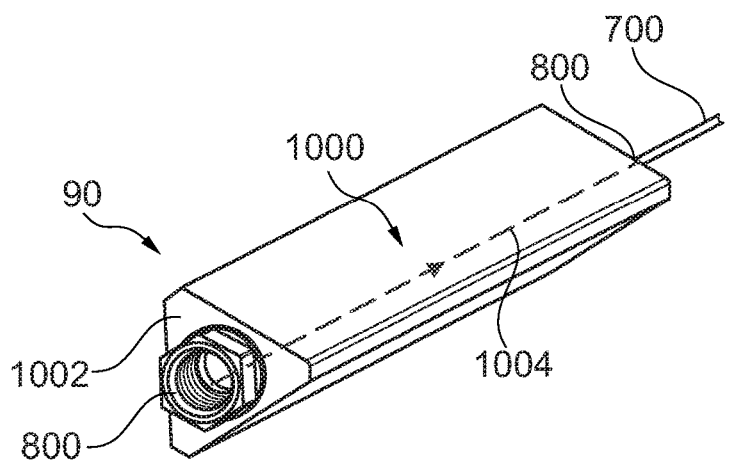
FIG. 10 shows the pre-heater assembly manufactured according to FIG. 6 to FIG. 9.

FIG. 10 shows a pre-heater assembly 90 according to an exemplary embodiment of the invention which is obtained by overmolding the arrangement of FIG. 8 and FIG. 9 with plastic material to thereby form the thermal coupling body

Figure 14:
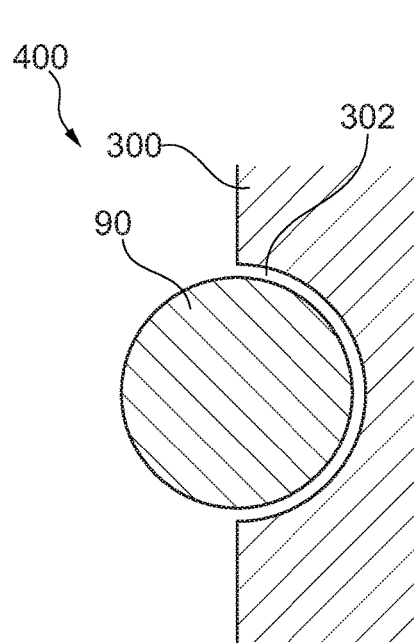
FIG. 14 to FIG. 16 show side views of arrangements according to exemplary embodiments of the invention comprising components inserted into mounting recesses of a mounting board.
Figure 15:
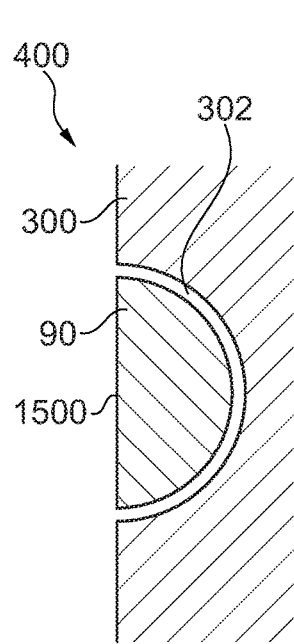
Figure 16:
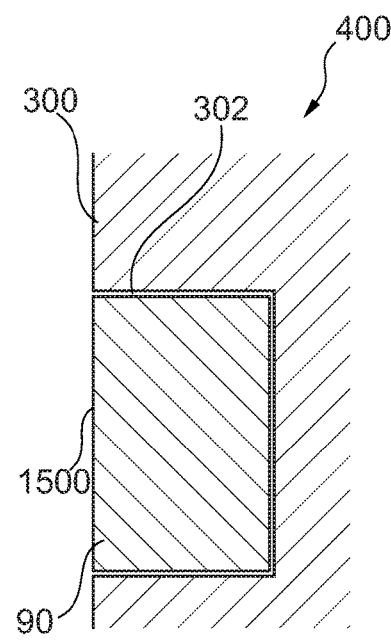

1000. Forming the thermal coupling body 1000 from plastic material has the advantage that it can be simply and cheaply manufactured by molding and that a monolithic pre-heater assembly 90 is obtained which promotes a proper thermal coupling to the exterior heat source 80. An exterior surface of the thermal coupling body 1000 also constitutes an external surface of the entire pre-heater assembly 90. When viewing the pre-heater assembly 90 from a viewing direction perpendicular to a flange face thereof at which the fittings 800 are located the pre-heater assembly 90 has a substantially V-shape. Thus, the pre-heater assembly 90 is substantially shaped as a regular prism with an equilateral triangular base surface 1002. In other embodiments, for instance when the groove (e.g., mounting recess 302 of the mounting board 300) is round or rectangular (e.g., as shown in FIGS. 14-16), the geometry of the pre-heater assembly 90 is correspondingly adapted to match with the alternative groove geometry (for instance to optimize the thermal coupling properties).

The pre-heater assembly 90 is configured for pre-heating a liquid (for instance a mixture between a mobile phase in the form of one or more solvents and a fluidic sample to be separated by the fluid separation apparatus 10). The capillary 700 can be made of steel or, for instance if the liquid to be conducted is a biological fluid, can be made of steel with an interior layer of biocompatible plastic such as peek, PTFE, etc. The capillary 700 is configured for conducting the liquid when it is driven by the pump 20. The capillary 700 may be formed with such a small inner diameter that the flow of the liquid within the lumen is laminar. The capillary 700 is monolithically embedded and fully surrounded by the thermal coupling body 1000 configured as a plastic molding compound (optionally with filler particles to adjust the value of the thermal conductivity of the thermal coupling body 1000) contacting the full circumferential surface of the capillary 700. When the plastic material of the thermal coupling body 1000 is mixed with thermally conductive filling particles, the resulting thermal coupling body 1000 can be adjusted to have a value of the thermal conductivity of approximately 20 W/(m K). This is a moderate value being higher than that of many thermally insulating plastic materials and being lower than that of conventional thermally conductive materials such as copper or aluminum (conventionally used thermally conductive materials may have a value of the thermal conductivity of more than 200 W/(m K)). The thermal coupling body 1000 forms an outer surface of the pre-heater assembly 90.

The thermal coupling body 1000 is arranged so that heat generated by a heat source (such as a Peltier heater) is supplied to the capillary 700 (and from there to the conducted liquid) via the thermal coupling body 1000. Preferably but not necessarily, the heat transfer mechanism from the heat source to the capillary 700 is heat conduction. FIG. 10 also shows an effective fluid flow direction 1004 which is defined by a connection line between the opposing fittings 800 of the pre-heater assembly 90, i.e. positions where the capillary 700 intersects with the thermal coupling body 1000. Although the liquid traversing the pre-heater assembly 90 follows the wound trajectory of the capillary 700 embedded by the material of the thermal coupling body 1000, the liquid effectively flows along the effective fluid flow direction 1004. The heat transfer from the heat source towards the capillary 700 occurs along a primary heat flow direction which is substantially perpendicular to the effective fluid flow direction 1004 and to the rectangular side surfaces of the thermal coupling body 1000.

However, there is a further—parasitic—heat transfer corresponding to a secondary heat flow direction from the hot liquid close to a fluid outlet interface towards the still colder liquid close to a fluid inlet interface of the pre-heater assembly 90. This results in an effective undesired temperature equilibration among different liquid parts or packets, and partially via the thermal coupling body 1000, which, in turn, results in an undesired cooling of the liquid close to the fluid outlet interface. A parasitic secondary heat flow direction is substantially perpendicular to the primary heat flow direction and antiparallel to the effective fluid flow direction 1004.

According to exemplary embodiments of the invention, it has been surprisingly found that the desired heat transfer along the primary heat flow direction is only slightly reduced, but the parasitic thermal energy flow along the secondary heat flow direction is significantly reduced by a selection of the value of the thermal conductivity of the material of the heat transfer body or thermal coupling body 1000 in a range between about 8 W/(m K) and about 100 W/(m K). It has further been surprisingly found that the net pre-heating performance of the liquid by the pre-heater assembly 90 is substantially improved by selecting an only moderately thermally conductive material of the thermal coupling body 1000.

Alternatively to the embodiment of FIG. 6 to FIG. 10 and even more preferably, the manufacturing may be performed by winding the capillary 700 isolatedly (for instance without carrier 600) before forming the thermal coupling body 1000 which then at least partially surrounds the wound capillary 700. In such an embodiment, the entire interior and exterior of the capillary 700 may be encapsulated by the thermal coupling body 1000, for instance by molding or casting. A wound capillary 700 encapsulated without a carrier 600 can be made from a stiff but bendable material to keep the capillary 700 in place and position after winding and before encapsulating.

A spirally shaped or helically wound capillary 700 has the particular advantage of a very low dispersion. This is advantageous for the accuracy of a chromatographic analysis.

Figure 12:
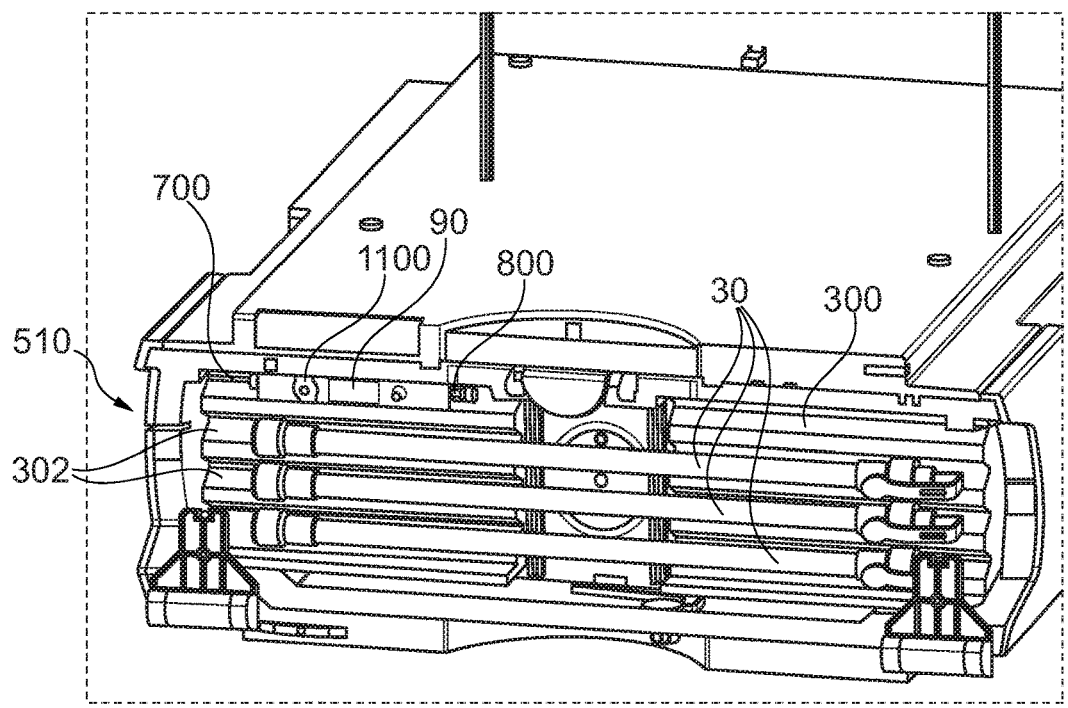

FIG. 11 illustrates a detail of and FIG. 12 illustrates an entire heating chamber 510 of a liquid separation system 10 according to an exemplary embodiment of the invention, wherein the heating chamber 510 is configured for heating a liquid of the liquid separation system 10 and comprises a pre-heater assembly 90 as described referring to FIG. 10 which is mounted in a mounting recess 302 formed as a groove within a mounting board 300 of the heating chamber 510.

The mounting board 300 is a plate made of a thermally highly conductive material such as aluminum. A plurality of substantially V-shaped grooves are formed as the mounting recesses 302 in the mounting board 300. The mounting recesses 302 are arranged horizontally and in parallel to one another. At the back side of the mounting board 300 (not shown in FIG. 11) a heat source may be mounted for heating the mounting board 300. By heat conduction, the pre-heater assembly 90 as shown in FIG. 10 and being mounted with full-face contact within one of the mounting recesses 302 is heated by the heated mounting board 300, Due to the modular arrangement of the mounting recesses 302, a plurality of pre-heater assemblies 90 and/or other fluidic members (such as one or more separation devices 30) may be mounted on the mounting board 300 and hence in the heat chamber 510.

In FIG. 11, only one pre-heater assembly 90 is mounted in one of the mounting recesses 302. The pre-heater assembly 90 shown in FIG. 10 is simply placed in one of the mounting recesses 302, and subsequently a fastening element 1100 (here configured as turning knob) is turned (for instance by 90°) so that its radially outermost portion engages an undercut section (for instance shaped as a dovetail groove) in a surface portion of the mounting recess 302 and thereby fastens the pre-heater assembly 90 in the mounting recess 302. The corresponding V-shapes of the pre-heater assembly 90 and of the mounting recess 302 substantially simplify the mounting procedure by providing guidance and by also promoting a proper heat transfer by heat conduction.

As can be taken from FIG. 12, additionally three separation units 30 (here configured as chromatographic separation columns) are mounted at other mounting recesses 302. Each of the separation units 30 is mounted on a respective mounting recess 302 with a gap or some distance between the separation unit 30 and an innermost surface of the mounting recess 302 so that the separation units 30 are heated by heat convection rather than by heat conduction, which may be desired for separation devices 30 to obtain a homogeneous heating.

Figure 13:
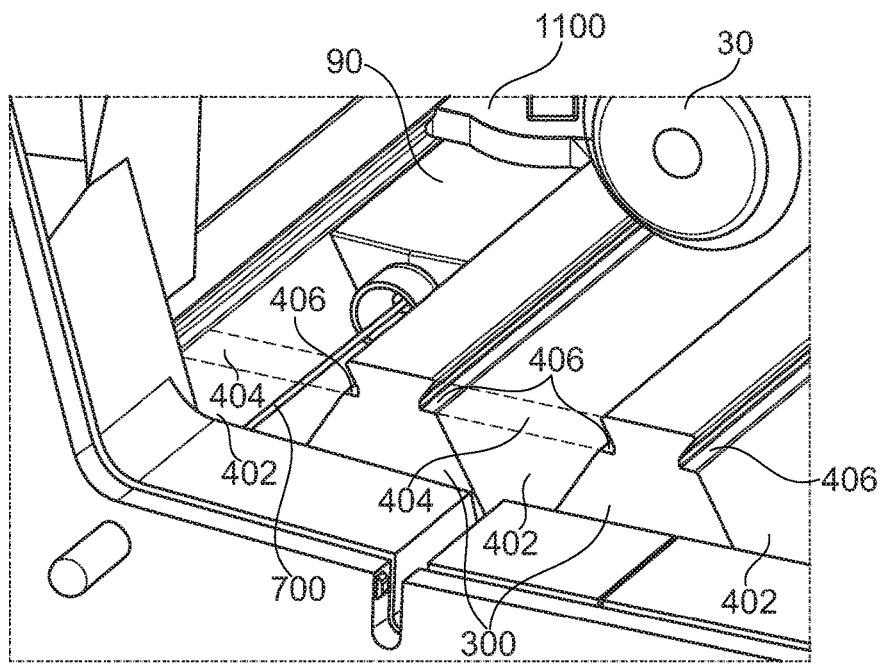
FIG. 13 shows a three-dimensional view of a portion of a pre-heater assembly according to an exemplary embodiment of the invention mounted in a mounting recess of a mounting board of, a fluid separation apparatus according to an exemplary embodiment of the invention.

FIG. 13 shows a three-dimensional view of a portion of pre-heater assembly 90 mounted in a corresponding mounting recess 302 of a mounting board 300. FIG. 13 particularly shows how the fastening element 1100 engages into an undercut 406 of the exterior recess section 404 to provide for a reversible fastening. The pre-heater assembly 90 rests with a form closure within the correspondingly shaped mounting recess 302.

FIG. 14 to FIG. 16 show side views of arrangements 400 according to exemplary embodiments of the invention comprising pre-heater assemblies 90 as components inserted into mounting recesses 302 of a mounting board 300.

In the embodiment of FIG. 14, the pre-heater assembly 90 (or any other component to be mounted in the mounting recess 302), is cylinder-shaped and hence circular or substantially circular in its cross-section so as to fit (in particular with form closure, but with clearance) into a substantially semicircular mounting recess 302 formed as a groove in the mounting board 300. The embodiment of FIG. 14 has the advantage, that a cylinder shaped pre-heater assembly 90 is easy in manufacture and that a circular contact surface can be manufactured with high precision.

In the embodiment of FIG. 15, the pre-heater assembly 90 (or any other component to be mounted in the mounting recess 302), is half cylinder-shaped and hence semicircular or substantially semicircular in its cross-section so as to fit (in particular with form closure, but with clearance) into a substantially semicircular mounting recess 302 formed as a groove in the mounting board 300. The embodiment of FIG. 15 has the advantage that an area of an exposed surface 1500 of the pre-heater assembly 90 when being mounted in the mounting recess 302 is smaller than in FIG. 14, which further reduces the heat losses. Furthermore, the embodiment of FIG. 15 is easy in manufacture, and a circular contact surface can be manufactured with high precision.

In the embodiment of FIG. 16, the pre-heater assembly 90 (or any other component to be mounted in the mounting recess 302), is cuboid-shaped and hence rectangular or substantially rectangular in its cross-section so as to fit (in particular with form closure, but with clearance) into a substantially rectangular mounting recess 302 formed as a groove in the mounting board 300. The embodiment of FIG. 16 has the advantage that an area of an exposed surface 1500 of the pre-heater assembly 90 when being mounted in the mounting recess 302 is smaller than in FIG. 14, which further reduces the heat losses.

Figure 17:
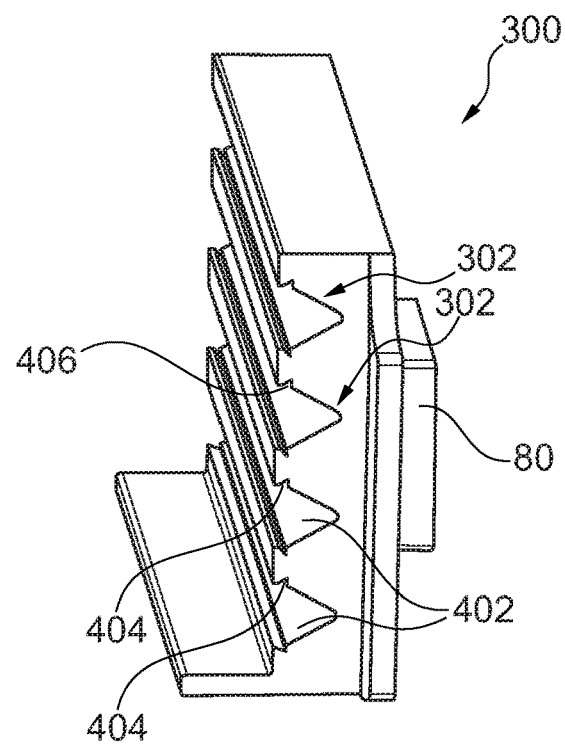
FIG. 17 shows a three-dimensional view of a mounting board of an arrangement according to an exemplary embodiment, wherein the mounting board has a plurality of horizontally arranged mounting recesses and a heat source attached to a backside thereof.

FIG. 17 shows a three-dimensional view of a vertically extending plate shaped mounting board 300 of an arrangement 400 according to an exemplary embodiment, wherein the mounting board 300 has a plurality of horizontally arranged guide rail like mounting recesses 302 and a heat source 80 attached to a backside thereof. By using opposing main surfaces of the aluminum body constituting the mounting board 300 for forming mounting recesses 302 and for attaching a heat source 80, a compact design is obtained and the heat flow path from the heat source 80 to the mounting recesses 300 is extremely short.

Figure 18:
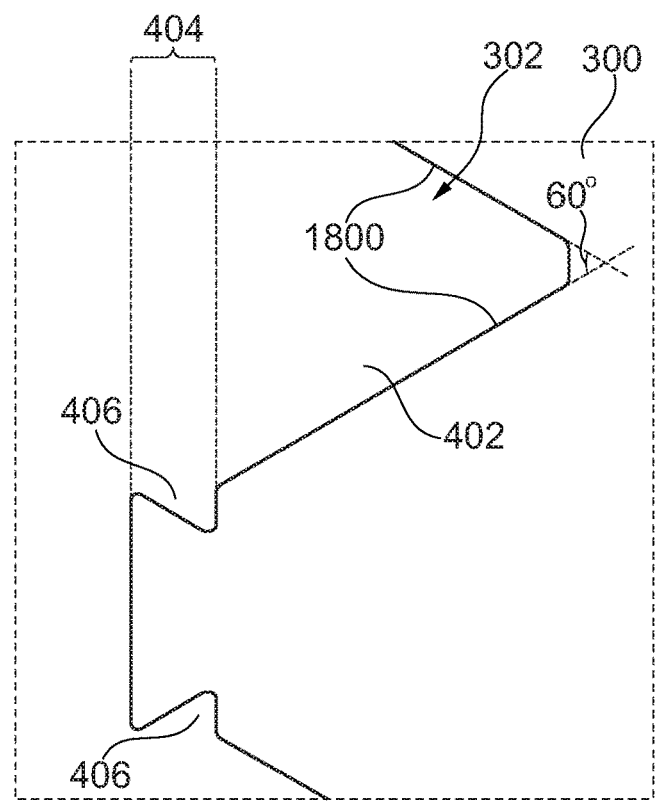
FIG. 18 shows a detail of a mounting recess of the mounting board of FIG. 17, wherein the mounting recess has a V-shaped interior recess section and a dovetail shaped exterior recess section.

FIG. 18 shows a detail of a mounting recess 302 of the mounting board 300 of FIG. 17, wherein the mounting recess 302 has a V-shaped interior recess section 402 (for accommodating a V-shaped component with contact) and a dovetail shaped exterior recess section 404 (for holding a component holder or for being engaged by a fastening element).

The interior recess section 402 has mutually slanted surfaces 1800 and is substantially V-shaped with a cross section being formed as an equilateral triangle. The exterior recess section 404 has an undercut 406 of a dovetail-type.

Figure 19:
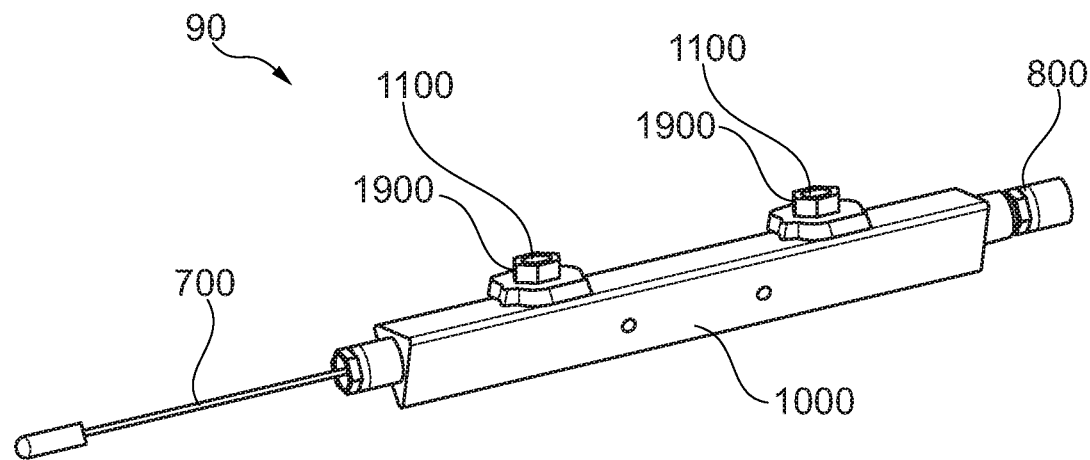
FIG. 19 shows a pre-heater assembly according to an exemplary embodiment with two turnable twistlock clips as fastening elements for fastening the pre-heater assembly in a mounting recess of an arrangement according to an exemplary embodiment of the invention.

FIG. 19 shows a pre-heater assembly 90 according to an exemplary embodiment with two turnable twistlock clips as fastening elements 1100 for fastening the pre-heater assembly 90 in a mounting recess 302 of an arrangement 400 according to an exemplary embodiment of the invention. The provision of two axially spaced fastening elements 1100 for one pre-heater assembly 90 allows for a very secure fastening of the pre-heater assembly 90 to the mounting board 300. A hexagonal bolt 1900 protrudes over a fastening portion of the fastening elements 1100 so as to be actuable by a corresponding tool. Manual handling of the fastening element 1100 may be enabled according to an exemplary embodiment as well.

Figure 20:
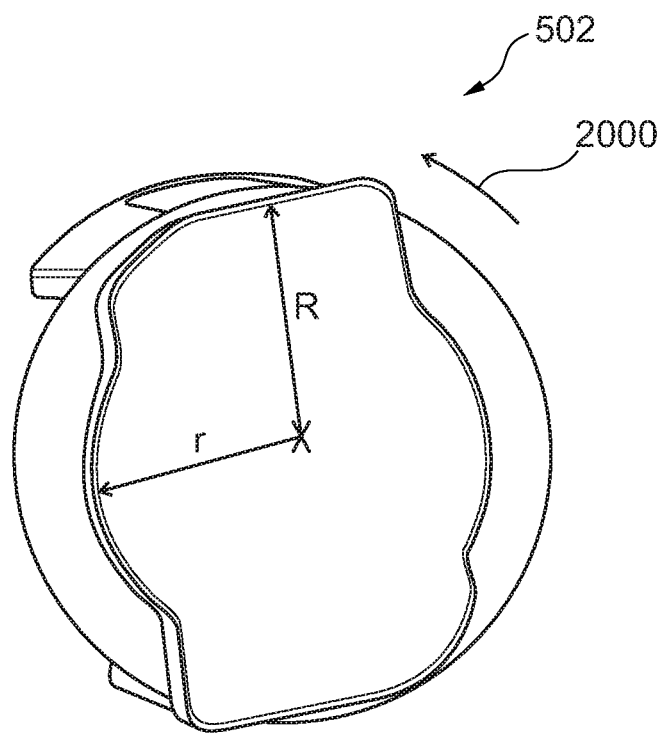
FIG. 20 shows a detail of one of the separation unit holders of FIG. 5.

FIG. 20 shows a detail of one of the separation unit holders 502 of FIG. 5. Around a turning direction 2000, according to which the separation unit holder 502 is actuated when being placed in the exterior recess section 404 of the mounting recess 302, a radius of an outermost end of a portion of separation unit holder 502 facing the mounting recess 302 varies. When the separation unit holder 502 is inserted into a mounting recess 302, a small radius "r" portion can be arranged adjacent to the exterior recess section 404. Upon turning the separation unit holder 502 by a predefined actuation angle of for instance a larger radius "R" portion engages the undercut at the exterior recess section 404 to thereby fasten the separation unit holder 502 at the mounting recess 302. In an embodiment, an engagement portion or a backside of the fastening element 1100 may be formed in the same way as the engagement portion or backside of the separation unit holder 502, i.e. with a radius of an outermost end portion facing the mounting recess 302 to vary circumferentially (R>r).

Figure 21:
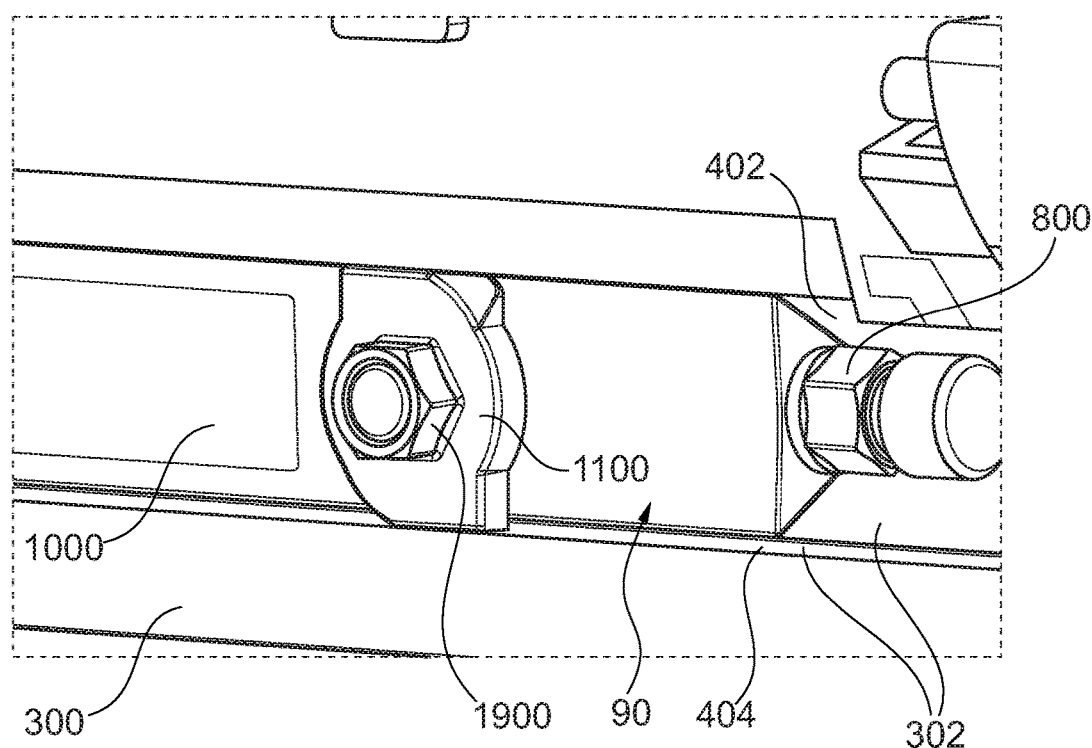
FIG. 21 illustrates a pre-heater assembly with a fastening element mounted within a mounting recess of a mounting board of an arrangement according to an exemplary embodiment of the invention.

FIG. 21 illustrates a pre-heater assembly 90 with a fastening element 1100 mounted within a mounting recess 302 of a mounting board 300 of an arrangement 400 according to an exemplary embodiment of the invention. The fastening element 1100 is shown in its fastening state in which it engages an undercut of the exterior recess section 404 of the mounting recess 302.

Figure 22:
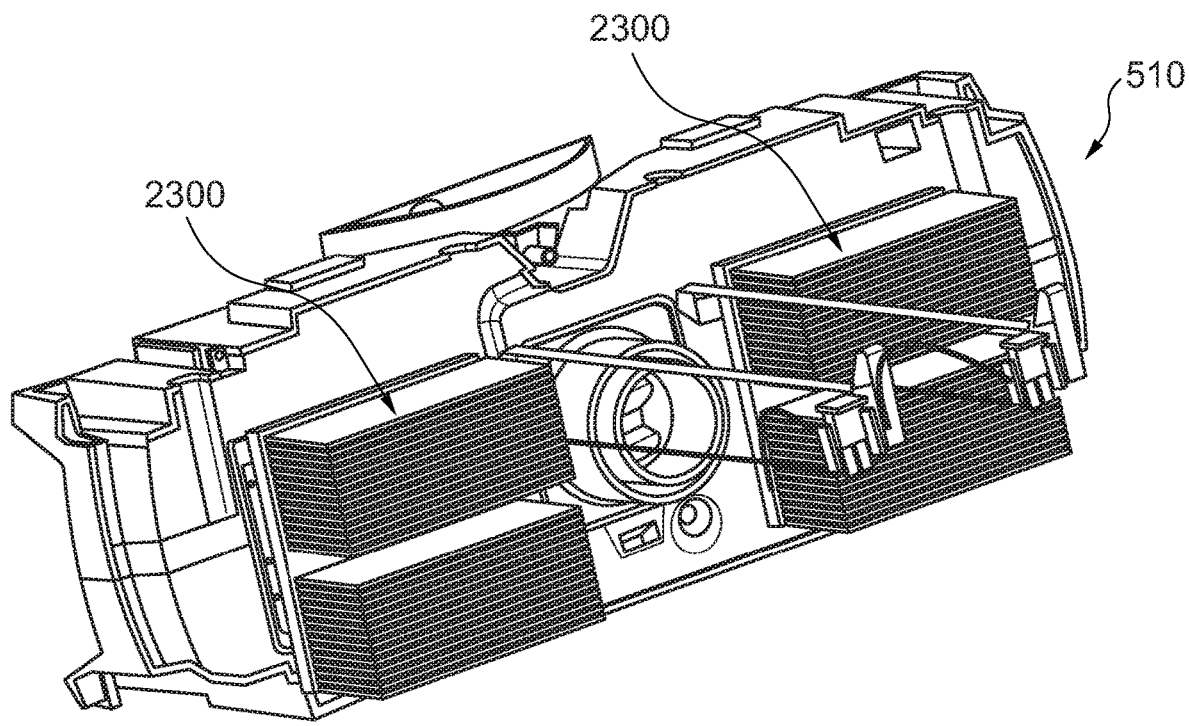
FIG. 22 shows a backside of a heating chamber according to an exemplary embodiment of the invention.
Figure 23:
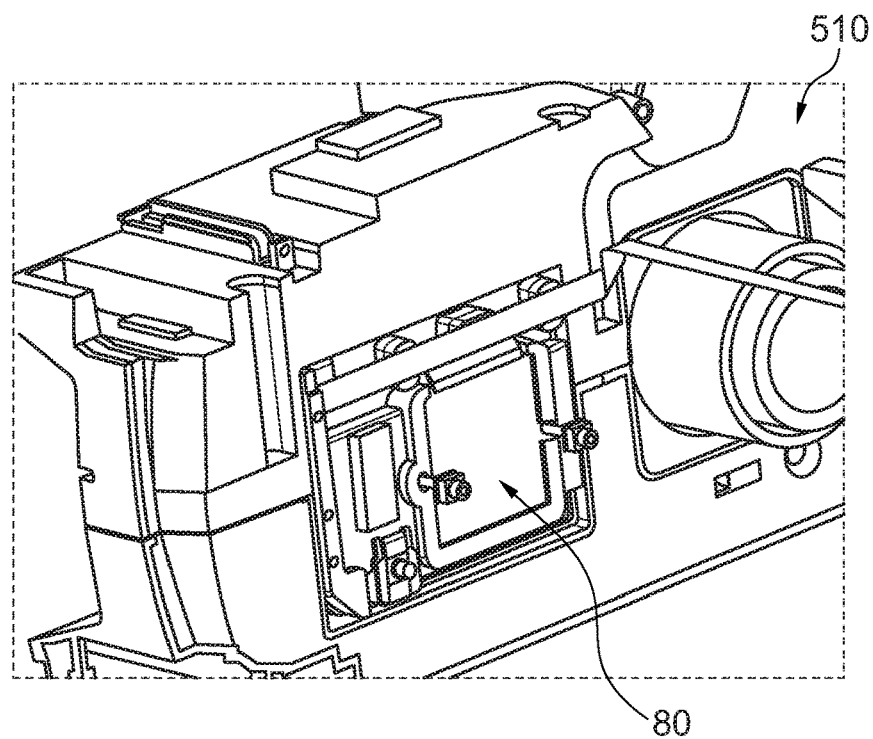
FIG. 23 illustrates a detail of the heating chamber of FIG. 22 after removing cooling fins and shows a heat source for heating a mounting board of an arrangement according to an exemplary embodiment of the invention.

FIG. 22 shows a backside of a heating chamber 510 according to an exemplary embodiment of the invention. In particular, cooling fins 2300 are shown. FIG. 23 illustrates a detail of the heating chamber 510 of FIG. 22 after removing the cooling fins 2300 and shows the then exposed heat source 80 for heating the mounting board 300 of an arrangement 400 according to an exemplary embodiment of the invention. The heat source 80 may be embodied as a Peltier heater.

Figure 24:
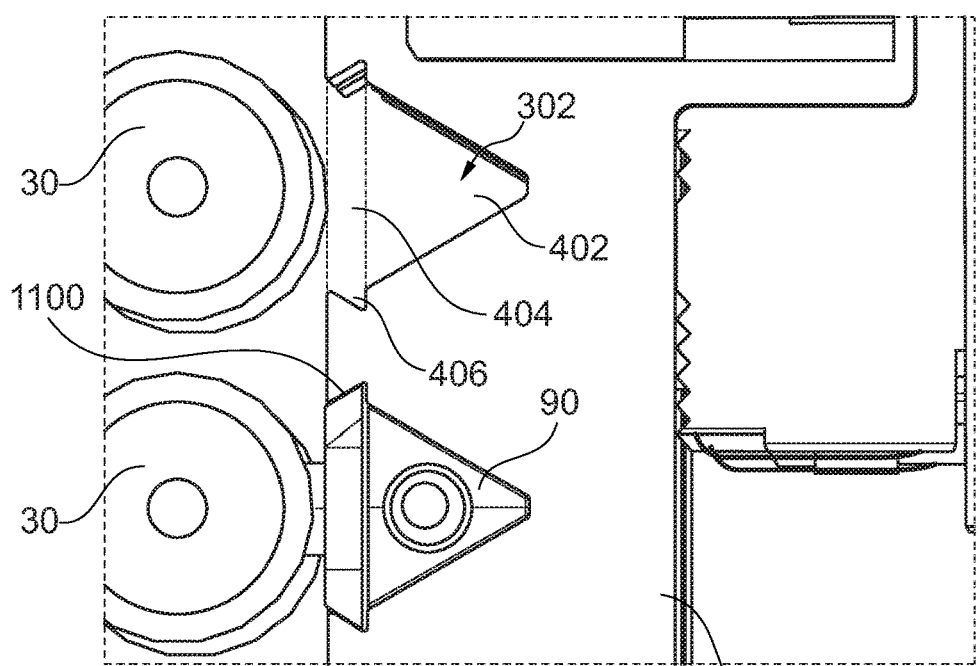
FIG. 24 shows a side view of a separation unit and a pre-heater assembly mounted by a fastening element at a mounting recess in a mounting board of an arrangement according to an exemplary embodiment of the invention.

FIG. 24 shows a side view of separation units 30 and a pre-heater assembly 90, the latter mounted by a fastening element 1100 at mounting recess 302 in mounting board 300. It can be taken from FIG. 24 that the fastening element 1100 engages an undercut section 406 of the mounting recess 302 and simultaneously presses the pre-heater assembly 90 against a correspondingly shaped wall surface of the mounting board 300.

Figure 25:
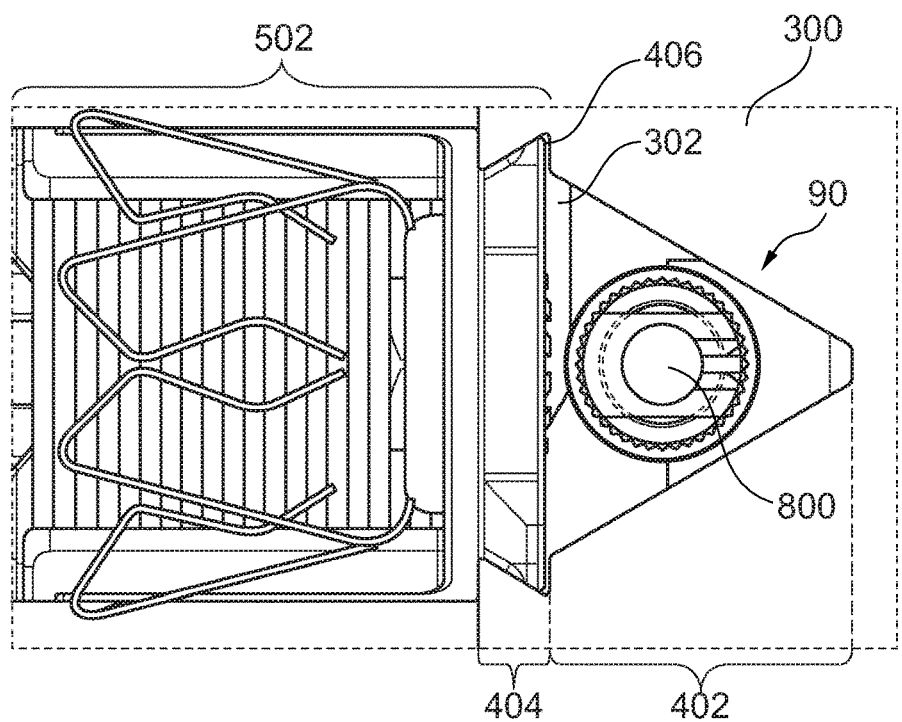
FIG. 25 shows a side view of a pre-heater assembly and a separation unit holder both being mounted at a mounting recess in a mounting board of an arrangement according to an exemplary embodiment of the invention.

FIG. 25 shows a side view of a pre-heater assembly 90 and a separation unit holder 502 both being mounted at a mounting recess 302 in, a mounting board 300 according to an exemplary embodiment of the invention. FIG. 25 shows that the interior recess section 402, the exterior recess section 404, the pre-heater assembly 90 and the separation unit holders 502 are configured to match to one another so that a separation unit holder 502 is mountable within the exterior recess section 404 while the pre-heater assembly 90 is already mounted in the interior recess section 402.

Figure 26:
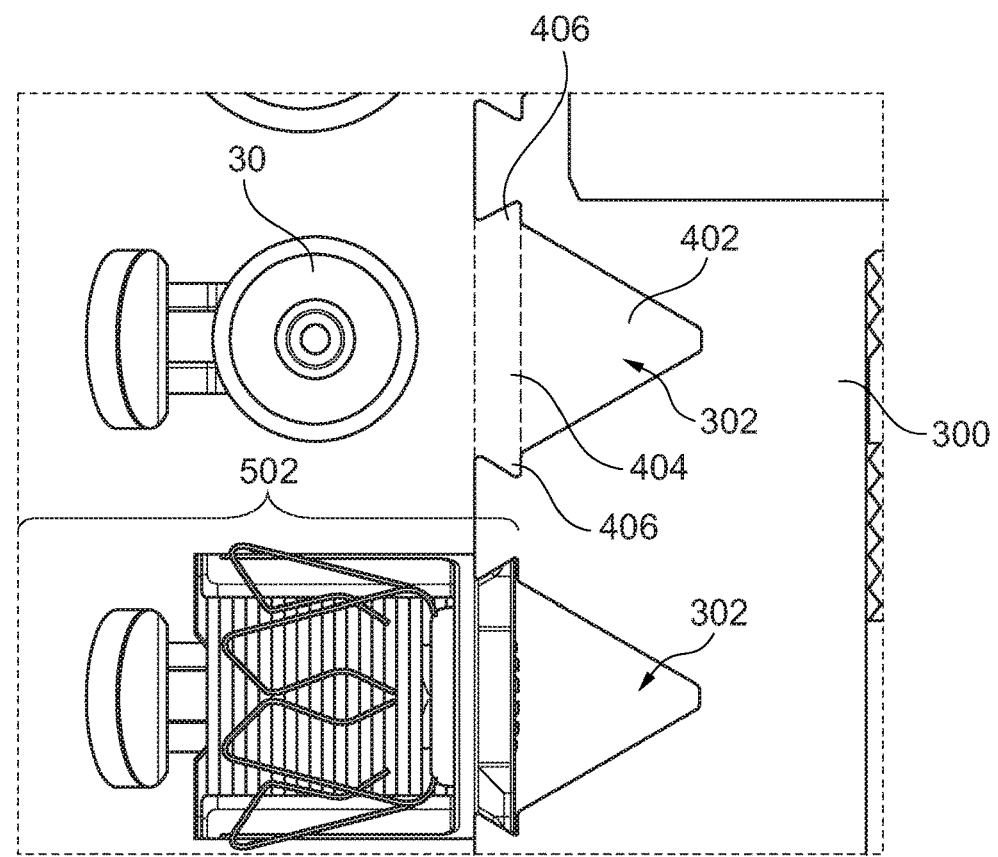
FIG. 26 shows a side view of a mounting board with mounting recesses of an arrangement according to an exemplary embodiment and multiple components mounted or to be mounted thereon.

FIG. 26 shows a side view of a mounting board 300 with mounting recesses 302 according to an exemplary embodiment and multiple components mounted or to be mounted thereon.

Figure 27:
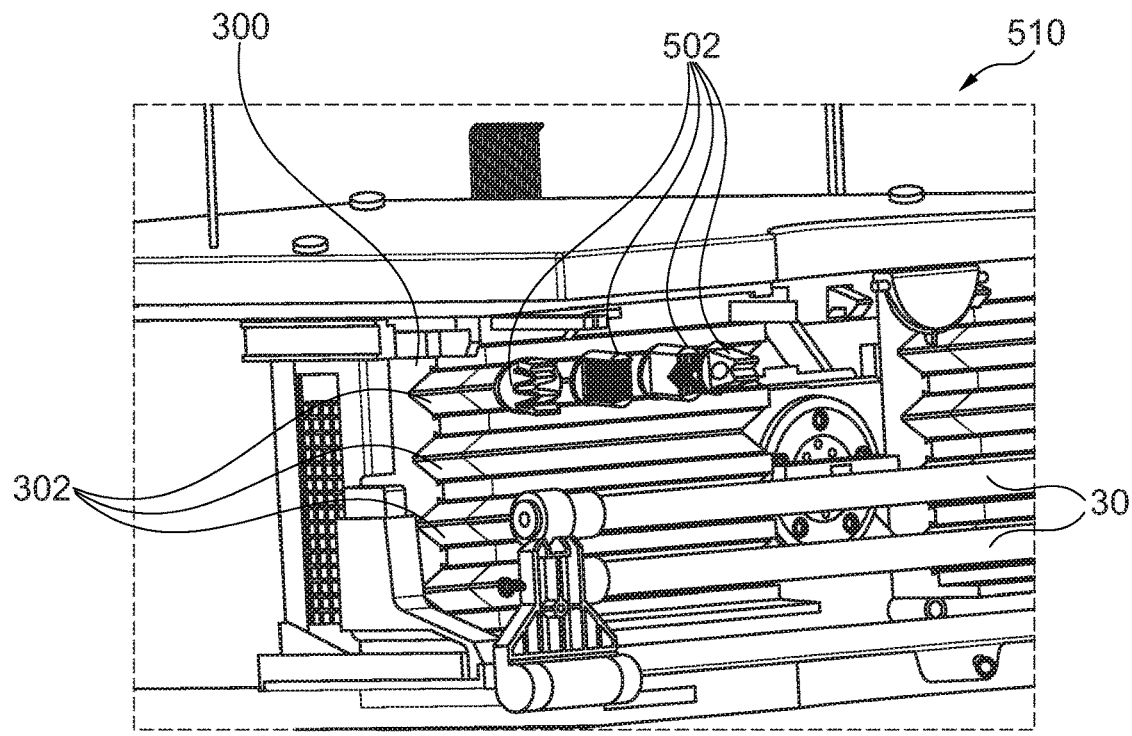
FIG. 27 and FIG. 28 each show a detail of a heating chamber according to an exemplary embodiment of the invention showing a plurality of components mounted in and on mounting recesses of a mounting board.
Figure 28:
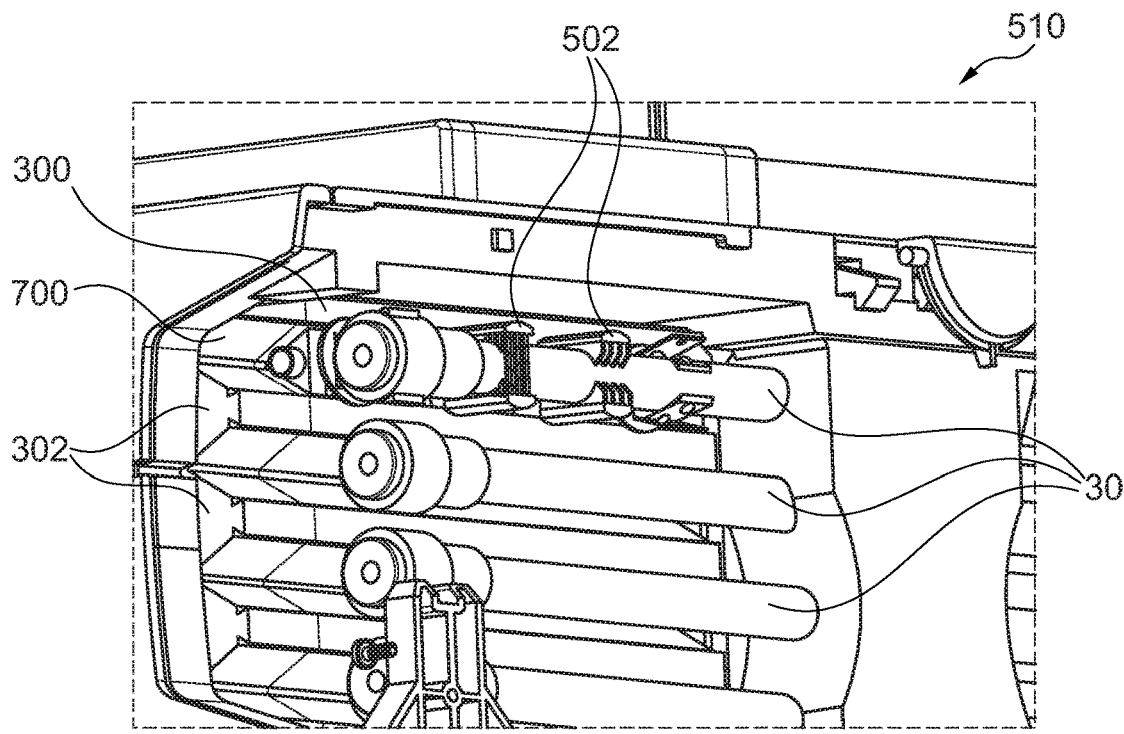

FIG. 27 and FIG. 28 each show a detail of a heating chamber 510 according to an exemplary embodiment of the invention showing a plurality of components mounted in and on mounting recesses 302 of a mounting board 300. In particular, FIG. 27 and FIG. 28 show different types of separation unit holders 502 each being mounted in exterior mounting sections 404 of the mounting recesses 302, formed of poorly thermally conductive or even thermally insulating material and being capable of gripping the separation units 30 by friction, spring force, etc.

Figure 29:
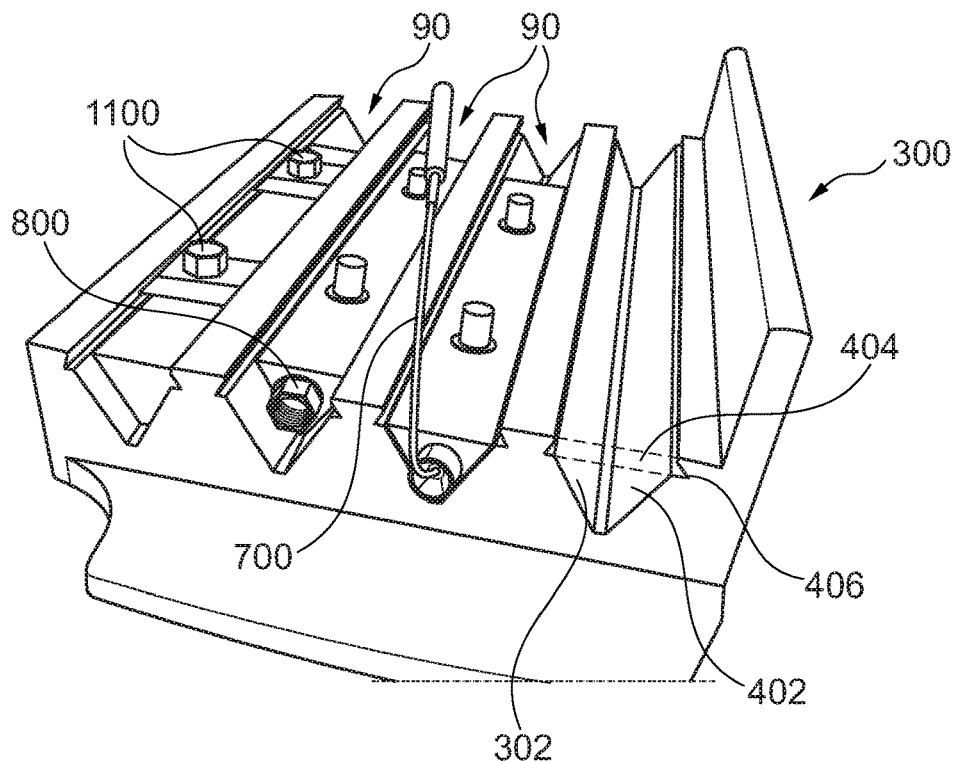
FIG. 29 shows a mounting board and a plurality of pre-heater assemblies mounted in mounting recesses thereof according to an exemplary embodiment of the invention.

FIG. 29 shows a mounting board 300 and a plurality of pre-heater assemblies 90 mounted in mounting recesses 302 thereof according to an exemplary embodiment of the invention. In one embodiment, a pre-heater assembly 90 comprises fittings 800 at both opposing ends. In another embodiment, a pre-heater assembly 90 comprises a fitting 800 at one end, and a free capillary 700 at the opposing end. In yet another embodiment, a pre-heater assembly 90 comprises free capillaries 700 at both opposing ends.

Figure 30:
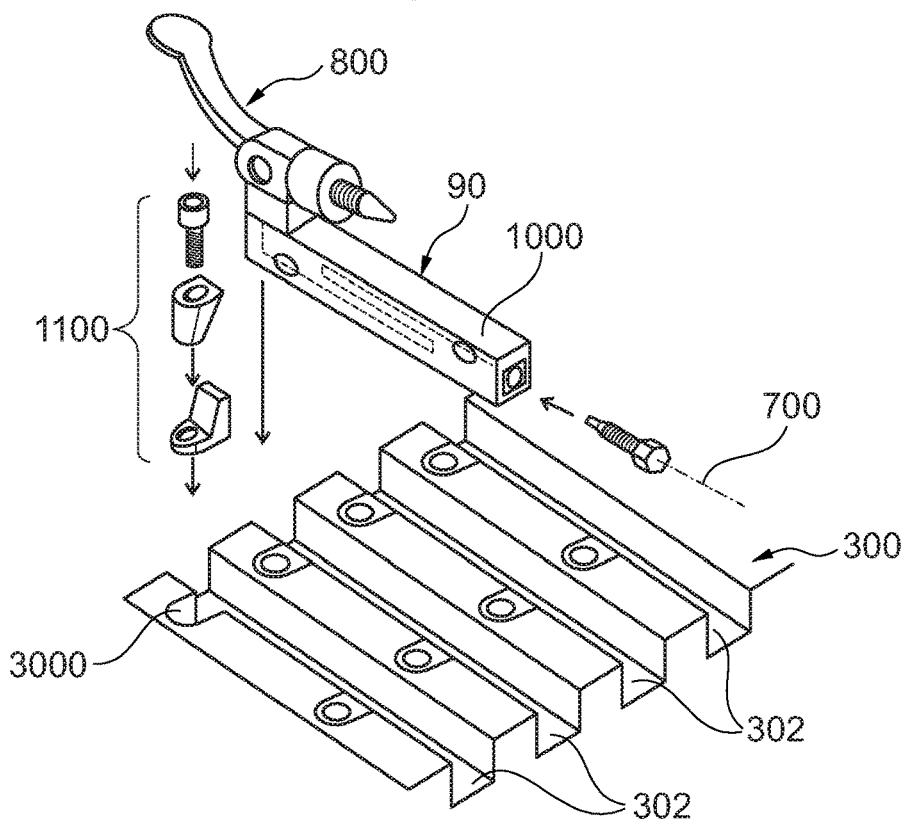
FIG. 30 shows an arrangement of a mounting board and a pre-heater assembly having a rectangular cross-section according to an exemplary embodiment of the invention.

FIG. 30 shows an arrangement of a mounting board 300 and a pre-heater assembly 90 having a rectangular cross-section according to an exemplary embodiment of the invention. For mounting the pre-heater assembly 90 in one of the mounting recesses 302 of the mounting board 300, it is simply attached thereto. Subsequently, a fastening element 1100 (here embodied as a screw and bolt mechanism) is inserted in a corresponding accommodation recess 3000 formed in the mounting board 300 and is fastened so as to press onto the pre-heater assembly 90. In order to connect the pre-heater assembly 90 to a fluidic periphery, it may be connected thereto via a fitting 800 (here embodied as a male fitting).

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. An arrangement for mounting components in a heating chamber for heating a fluid of a fluid separation apparatus, the arrangement comprising:

a mounting board comprising at least one mounting recess, the at least one mounting recess comprising slanted surfaces forming a V-shape; and a pre-heater assembly configured for heating the fluid upstream and/or downstream of a separation unit of the fluid separation apparatus, the pre-heater assembly comprising slanted surfaces forming a V-shape, wherein the pre-heater assembly is configured to be mountable in the at least one mounting recess, wherein the slanted surfaces of the pre-heater assembly are complementary to the slanted surfaces of the at least one mounting recess such that the pre-heater assembly and the at least one mounting recess have corresponding lateral surfaces substantially covering each other and faces of the lateral surfaces are pressed against each other.

2. The arrangement of claim 1, wherein the pre-heater assembly comprises a capillary having a lumen configured for conducting the fluid and a thermal coupling body contacting at least part of the capillary and arrangable so that heat generated by a heat source is supplied to the capillary via at least part of the thermal coupling body.

3. The arrangement of claim 1, further comprising a heat source configured for generating heat for heating the mounting board.

4. The arrangement of claim 3, wherein the heat source is attached to the mounting board.

5. The arrangement of claim 3, wherein the heat source is a Peltier heat source.

6. The arrangement of claim 4, wherein the mounting board comprises a backside and a front side opposing the backside, the at least one mounting recess is arranged at the front side, and the heat source is attached to the backside.

7. The arrangement of claim 1, comprising a feature selected from the group consisting of:

the mounting board is made of a material having a thermal conductivity of at least 150 W/(m K);

the mounting board is made of a material comprising aluminum or copper;

the mounting board is plate-shaped;

the at least one mounting recess is configured as at least one mounting groove within the mounting board; and a combination of two or more of the foregoing.

8. The arrangement of claim 1, wherein the at least one mounting recess comprises an interior recess section configured for accommodating the pre-heater assembly, and an exterior recess section arranged between the interior recess section and a surrounding outside of the mounting board and configured for accommodating an additional component.

9. The arrangement of claim 8, wherein the exterior recess section comprises a feature selected from the group consisting of:

the exterior recess section comprises an undercut;

the exterior recess section comprises a triangular undercut; and the exterior recess section comprises a T-shaped undercut.

10. The arrangement of claim 8, wherein the exterior recess section comprises a dovetail-type undercut.

11. The arrangement of claim 8, comprising a configuration selected from the group consisting of:

the interior recess section, the exterior recess section, the pre-heater assembly and the additional component are configured to match to one another so that the additional component is mountable within the exterior recess section while the pre-heater assembly is already mounted in the interior recess section;

the interior recess section, the exterior recess section, the pre-heater assembly and the additional component are configured to match to one another so that the additional component is mountable within the exterior recess section while the pre-heater assembly is already mounted in the interior recess section, wherein component is a fastening element for fastening the pre-heater assembly to the mounting recess; and the interior recess section, the exterior recess section, the pre-heater assembly and the additional component are configured to match to one another so that the additional component is mountable within the exterior recess section while the pre-heater assembly is already mounted in the interior recess section, wherein the additional component is a separation unit holder for holding a separation unit for separating the fluid in the fluid separation apparatus.

12. The arrangement of claim 1, further comprising a fastening element configured for fastening the pre-heater assembly in the at least one mounting recess.

13. The arrangement of claim 12, wherein the fastening element is configured to be actuable by turning to thereby fasten the pre-heater assembly in the at least one mounting recess.

14. The arrangement of claim 13, wherein the at least one mounting recess comprises an undercut section, and the fastening element is configured to fasten the pre-heater assembly in the at least one mounting recess by attaching the pre-heater assembly to the at least one mounting recess and subsequently actuating the fastening element to thereby fasten the fastening element in the undercut section.

15. The arrangement of claim 1, comprising an additional component configured to be mountable in and/or on the at least one mounting recess, wherein the additional component comprises:
a separation unit holder configured for holding a separation unit for separating the fluid in the fluid separation apparatus.

16. The arrangement of claim 15, wherein the at least one mounting recess comprises an interior recess section configured for accommodating the pre-heater assembly, and an exterior recess section arranged between the interior recess section and a surrounding outside of the mounting board and configured for accommodating the additional component.

17. A fluid separation apparatus for separating a fluidic sample into a plurality of fractions, the apparatus comprising:
a fluid drive unit configured for driving a fluid comprising a mobile phase and the fluidic sample in the mobile phase;
a separation unit configured for separating the fluidic sample into the plurality of fractions; and
the arrangement of claim 1, wherein the pre-heater assembly is configured to be connected in fluid communication with the separation unit.

18. A method for mounting components in a heating chamber for heating a fluid of a fluid separation apparatus, the method comprising:
providing a mounting board comprising at least one mounting recess, the at least one mounting recess comprising slanted surfaces forming a V-shape; and
mounting a pre-heater assembly to the at least one mounting recess, the pre-heater assembly configured for heating the fluid upstream and/or downstream of a separation unit of the fluid separation apparatus, the pre-heater assembly comprising slanted surfaces forming a V-shape,
wherein the slanted surfaces of the pre-heater assembly are complementary to the slanted surfaces of the at least one mounting recess such that the pre-heater assembly and the at least one mounting recess have corresponding lateral surfaces substantially covering each other and faces of the lateral surfaces are pressed against each other.

19. The method of claim 18, wherein:
the at least one mounting recess comprises an interior recess section, and an exterior recess section arranged between the interior recess section and a surrounding outside of the mounting board;
mounting the pre-heater assembly comprises mounting the pre-heater assembly in the interior recess section; and
the method further comprises mounting an additional component to the exterior recess section.

20. The method of claim 19, wherein the additional component comprises
a separation unit holder configured for holding a separation unit for separating the fluid in the fluid separation apparatus.

* * * * *